(12) United States Patent
Ko et al.

(10) Patent No.: US 12,033,382 B2
(45) Date of Patent: Jul. 9, 2024

(54) ELECTRONIC DEVICE AND METHOD FOR REPRESENTING CONTENTS BASED ON GAZE DWELL TIME

(71) Applicant: SAMSUNG ELECTRONICS CO., LTD., Suwon-si (KR)

(72) Inventors: Taehun Ko, Suwon-si (KR); Jiyeon Shin, Suwon-si (KR); Hoon Han, Suwon-si (KR); Yunjeong Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/959,494

(22) Filed: Oct. 4, 2022

(65) Prior Publication Data

US 2023/0094073 A1 Mar. 30, 2023

Related U.S. Application Data

(63) Continuation of application No. PCT/KR2022/014115, filed on Sep. 21, 2022.

(30) Foreign Application Priority Data

Sep. 27, 2021 (KR) .................. 10-2021-0127434

(51) Int. Cl.
*G06V 20/20* (2022.01)
*G06F 3/03* (2006.01)
(Continued)

(52) U.S. Cl.
CPC ............. *G06V 20/20* (2022.01); *G06F 3/03* (2013.01); *G06T 3/40* (2013.01); *G06T 11/00* (2013.01); *G06V 40/28* (2022.01)

(58) Field of Classification Search
CPC .......... G06V 20/20; G06V 40/28; G06F 3/03; G06T 3/40; G06T 11/00
See application file for complete search history.

(56) References Cited

U.S. PATENT DOCUMENTS

| 10,134,189 B2 | 11/2018 | Yamamoto et al. |
| 10,528,310 B2 | 1/2020 | Li |

(Continued)

FOREIGN PATENT DOCUMENTS

| KR | 10-2014-0144510 A | 12/2014 |
| KR | 1020150096474 A | 8/2015 |

(Continued)

OTHER PUBLICATIONS

International Search Report (PCT/ISA/210) and Written Opinion (PCT/ISA/237) dated Jan. 2, 2023 issued by the International Searching Authority in International Application No. PCT/KR2022/014115.

*Primary Examiner* — Afroza Chowdhury
(74) *Attorney, Agent, or Firm* — Sughrue Mion, PLLC

(57) ABSTRACT

Provided is an electronic device including a body part, a glass member disposed on the body part, a display disposed on the glass member, a support part rotatably connected to the body part, a sensor including an eye tracking camera and a front camera configured to capture an image of a front side of a user, and a processor operatively connected to the display and the sensor, wherein the processor is configured to output at least one content via the display, recognize at least one object by the front camera, obtain the user's gaze dwell time for the object by the eye tracking camera, based on the gaze dwell time being longer than or equal to a reference time, obtain an area occupied by the object in a field of view (FOV) of the front camera, based on the area, output the at least one content on a region having no overlap with the object, or reduce a size of the at least one content (Continued)

and output the at least one content on one side of the display, and based on the user's gaze dwell time for the object being less than the reference time, output the at least one content in a type identical to an initial output type.

19 Claims, 26 Drawing Sheets

(51) Int. Cl.
    *G06T 3/40*     (2024.01)
    *G06T 11/00*     (2006.01)
    *G06V 40/20*     (2022.01)

(56) References Cited

U.S. PATENT DOCUMENTS

| | | |
|---|---|---|
| 10,591,729 B2 | 3/2020 | Watanabe et al. |
| 2011/0298702 A1 | 12/2011 | Sakata et al. |
| 2013/0147836 A1* | 6/2013 | Small .................. G06T 19/006 345/633 |
| 2013/0222638 A1* | 8/2013 | Wheeler ............... G06F 3/0482 348/333.01 |
| 2014/0168056 A1 | 6/2014 | Swaminathan et al. |
| 2014/0361984 A1 | 12/2014 | Kim et al. |
| 2015/0153570 A1* | 6/2015 | Yamamoto ........ H04M 1/72448 345/184 |
| 2016/0025982 A1 | 1/2016 | Sutherland et al. |
| 2016/0282618 A1* | 9/2016 | Kon .................... G02B 27/017 |
| 2019/0221191 A1 | 7/2019 | Chhipa et al. |

FOREIGN PATENT DOCUMENTS

| | | |
|---|---|---|
| KR | 1020180116044 A | 10/2018 |
| KR | 1020200040716 A | 4/2020 |
| KR | 1020200110771 A | 9/2020 |
| WO | 2017192130 A1 | 11/2017 |

* cited by examiner

FIG. 14
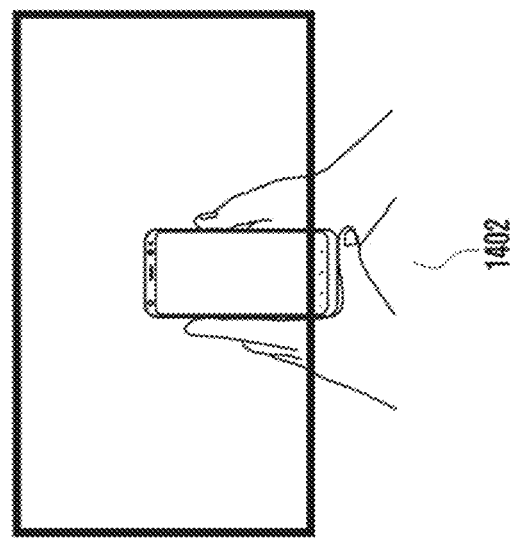
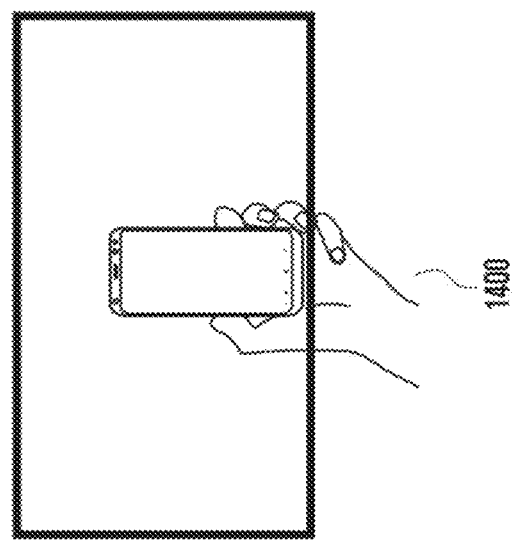

ELECTRONIC DEVICE AND METHOD FOR REPRESENTING CONTENTS BASED ON GAZE DWELL TIME

CROSS REFERENCE TO RELATED APPLICATIONS

This application is a bypass continuation application of International Application No. PCT/KR2022/014115, filed on Sep. 21, 2022, which is based on and claims the priority to Korean Patent Application No. 10-2021-0127434, filed on Sep. 27, 2021, in the Korean Intellectual Property Office, the disclosures of which are incorporated by reference herein in their entireties

BACKGROUND

Embodiments of the present disclosure relate to an electronic device and, for example, to a technology relating to a method for displaying content in the electronic device.

According to the development of mobile communication technologies and hardware/software technologies, portable electronic devices (hereinafter, an electronic device) have become capable of implementing various functions as well as a conventional call function. An electronic device can display various content information on a display (e.g., a head-mounted display (HMD)). For example, the electronic device can display content in a user's field of view (FOV) by using a display disposed at a glass member. The electronic device may further include a body part and a support part, and may be operated as a wearable device providing a user with a detaching/attaching function and a mounting function by using the body part and the support part. For example, the electronic device may be augmented reality (AR) glasses capable of providing virtual information to a display.

The electronic device may include at least one camera mounted to a front surface portion and a rear surface portion, and can recognize an object positioned in front of or behind the electronic device by using the camera. The electronic device may include an eye tracking camera capable of tracking a user's gaze.

When a conventional electronic device displays content while a user wears an AR or VR HMD, it may be difficult for the user to concurrently recognize an object located within the user's field of view (FOV). For example, when content displayed while a user wears an AR HMD, and a terminal device exist in the same straight line within the user's field of view, it may be difficult for the user to recognize the terminal device.

An aspect of various embodiments is to provide a display method by which, when a user intends to recognize an object in front of the user while an electronic device displays content as described above, the content displayed on a display or the object positioned in front of the user can be both recognized according to the user's intent by varying a method of displaying the content.

SUMMARY

According to an aspect of an embodiment, there is provided an electronic device including a body part, a glass member disposed on the body part, a display disposed on the glass member, a support part rotatably connected to the body part, a sensor including an eye tracking camera and a front camera configured to capture an image of a front side of a user, and a processor operatively connected to the display and the sensor, wherein the processor is configured to output at least one content via the display, recognize at least one object by the front camera, obtain the user's gaze dwell time for the object by the eye tracking camera, based on the gaze dwell time being longer than or equal to a reference time, obtain an area occupied by the object in a field of view (FOV) of the front camera, based on the area, output the at least one content on a region having no overlap with the object, or reduce a size of the at least one content and output the at least one content on one side of the display, and based on the user's gaze dwell time for the object being less than the reference time, output the at least one content in a type identical to an initial output type.

The processor may be further configured to obtain position coordinates of the object in the FOV by the front camera, determine, based on the position coordinates, a region on which the object is positioned in an edge region of the FOV or a center region of the FOV, and output the at least one content, based on the area and the region on which the object is positioned in the FOV.

The processor may be further configured to, based on the object being positioned in the edge region of the FOV, or the area being smaller than a predetermined area, output the at least one content on a region having no overlap with the object, and based on the object being positioned in the center region of the FOV, and the area being equal to or greater than the predetermined area, reduce the size of the at least one content and output the at least one content on one side of the display.

The processor may be further configured to, based on the at least one content being output on the region having no overlap with the object, based on the area occupied by the object being smaller than the predetermined area, output the at least one content on a region remaining excluding a region displaying the object, and based on the area occupied by the object being equal to or greater than the predetermined area, and the region displaying the object being included in the edge region, move a region outputting the at least one content so that the moved region does not overlap with the region displaying the object.

The processor may be further configured to determine whether the object is a pre-registered object based on an image of the object obtained using the front camera, and based on the object being a pre-registered object, obtain the user's gaze dwell time for the object.

The processor may be further configured to, based on the object being a pre-registered object, output a graphic user interface (UI) including additional information corresponding to the object on the display.

The processor may be further configured to, based on the size of the at least one content being reduced and the at least one content being output on one side of the display temporarily stop reproduction of the content at a time point of reducing the size of the content.

The processor may be further configured to search for an image corresponding to the object and obtain related information corresponding to the image, and output a graphic user interface (UI) including the related information at one side of the object in the FOV.

The processor may be further configured to obtain an image of a hand of the user with which the object is held by the front camera, based on the gaze dwell time being equal to or longer than the reference time, and the object being held with one hand of the user, output the at least one content on a region having no overlap with the object, based on the area, and based on the gaze dwell time being equal to or longer than the reference time, and the object being held with both hands of the user, reduce the size of the at least one content and output the at least one content on one side of the display.

The processor may be further configured to, based on the front camera recognizing a first object and a second object, determine, as an object of interest, at least one of the first object and the second object, based on a first gaze dwell time for the first object and a second gaze dwell time for the second object, and output the at least one content, based on an area occupied by the at least one object of interest in the FOV.

The processor may be further configured to determine the user has recognized the object, based on recognizing a gesture of a hand of the user holding the object by the front camera.

The processor may be further configured to generate a unique gesture of an object, map the unique gesture to the object, and store the mapped unique gesture and object, and based on the unique gesture being recognized, determine the user has recognized the object mapped to the unique gesture.

The processor may be further configured to determine an importance level of the at least one content, and based on the importance level being equal to or greater than a predetermined value, the size of the at least one content being reduced, and the at least one content being output on one side of the display, simultaneously output the at least one content and the object, based on a user input.

According to another aspect of an embodiment, there is provided a content display method of an electronic device, the method including outputting at least one content on a display, recognizing at least one object by a front camera, obtaining a user's gaze dwell time for the object by an eye tracking camera, based on the gaze dwell time being longer than or equal to a reference time, obtaining an area occupied by the object in a field of view (FOV) of the front camera, based on the area, outputting the at least one content on a region having no overlap with the object, or reducing a size of the at least one content and outputting the at least one content on one side of the display, and based on the user's gaze dwell time for the object being less than the reference time, outputting the at least one content in a type identical to an initial output type.

The outputting of the content may further include obtaining position coordinates of the object in the FOV by the front camera, determining, based on the position coordinates, a region on which the object is positioned in an edge region or a center region of the FOV, and outputting the at least one content, based on the area and the region on which the object is positioned in the FOV.

The outputting of the content may further include based on the object being positioned in the edge region of the FOV, or the area being smaller than a predetermined area, outputting the at least one content on a region having no overlap with the object, and based on the object being positioned in the center region of the FOV, and the area being equal to or greater than the predetermined area, reducing the size of the at least one content and outputting the at least one content on one side of the display.

The outputting of the content may further include determining whether the object is a pre-registered object, based on an image of the object obtained by the front camera, and based on the object being a pre-registered object, obtaining the user's gaze dwell time for the object.

The outputting of the content may further include based on the size of the at least one content being reduced and the at least one content being output on one side of the display, temporarily stopping reproduction of the content at a time point of reducing the size of the content.

The outputting of the content may further include obtaining an image of a hand of the user with which the object is held by the front camera, based on the gaze dwell time being equal to or longer than the reference time, and the object being held with one hand of the user, outputting the at least one content on a region having no overlap with the object, based on the area, and based on the gaze dwell time being equal to or longer than the reference time, and the object being held with both hands of the user, reducing the size of the at least one content and outputting the at least one content on one side of the display.

The outputting of the content may further include based on the front camera recognizing a first object and a second object, determining, as an object of interest, at least one of the first object and the second object, based on a first gaze dwell time for the first object and a second gaze dwell time for the second object, and outputting the at least one content, based on an area occupied by the at least one object of interest in the FOV.

According to various embodiments, an electronic device may change a content output type, based on an area occupied by an object within a user's field of view, and a time for which the user's gaze is at the object. When a user focuses on content displayed on a display and a real object or the content thereof at the same time, the electronic device may output the content on a region having no overlap with the real object, based on an area occupied by the real object within a camera's field of view. When the user preferentially focuses on an object in front of the user, the electronic device may reduce the size of the content and output the content on one side of the display so that the user's convenience can be achieved.

Other effects obtainable or predicted by various embodiments of the electronic device will be directly or implicitly described in detailed description for the embodiments of the electronic device. For example, various effects predicted according to various embodiments of the electronic device will be described in the following detailed description.

BRIEF DESCRIPTION OF THE DRAWINGS

The above and/or other aspects will become apparent and more readily appreciated from the following description of embodiments, taken in conjunction with the accompanying drawings in which:

FIG. 14 is a diagram illustrating an embodiment of determining an output type according to the number of hands with which a user holds an object according to various embodiments;

DETAILED DESCRIPTION

Hereinafter, embodiments of the disclosure will be described in detail with reference to the accompanying drawings.

In describing the embodiments, descriptions related to technical contents which are well-known in the art to which the disclosure pertains, and are not directly associated with the disclosure, will be omitted. Moreover, detailed descriptions related to elements having substantially identical configurations and functions will be omitted.

For the same reason, in the accompanying drawings, some elements may be exaggerated, omitted, or schematically shown, and a size of each element does not precisely reflect the actual size. Accordingly, the disclosure is not restricted by a relative size or interval shown in the accompanying drawings.

Figure 1:
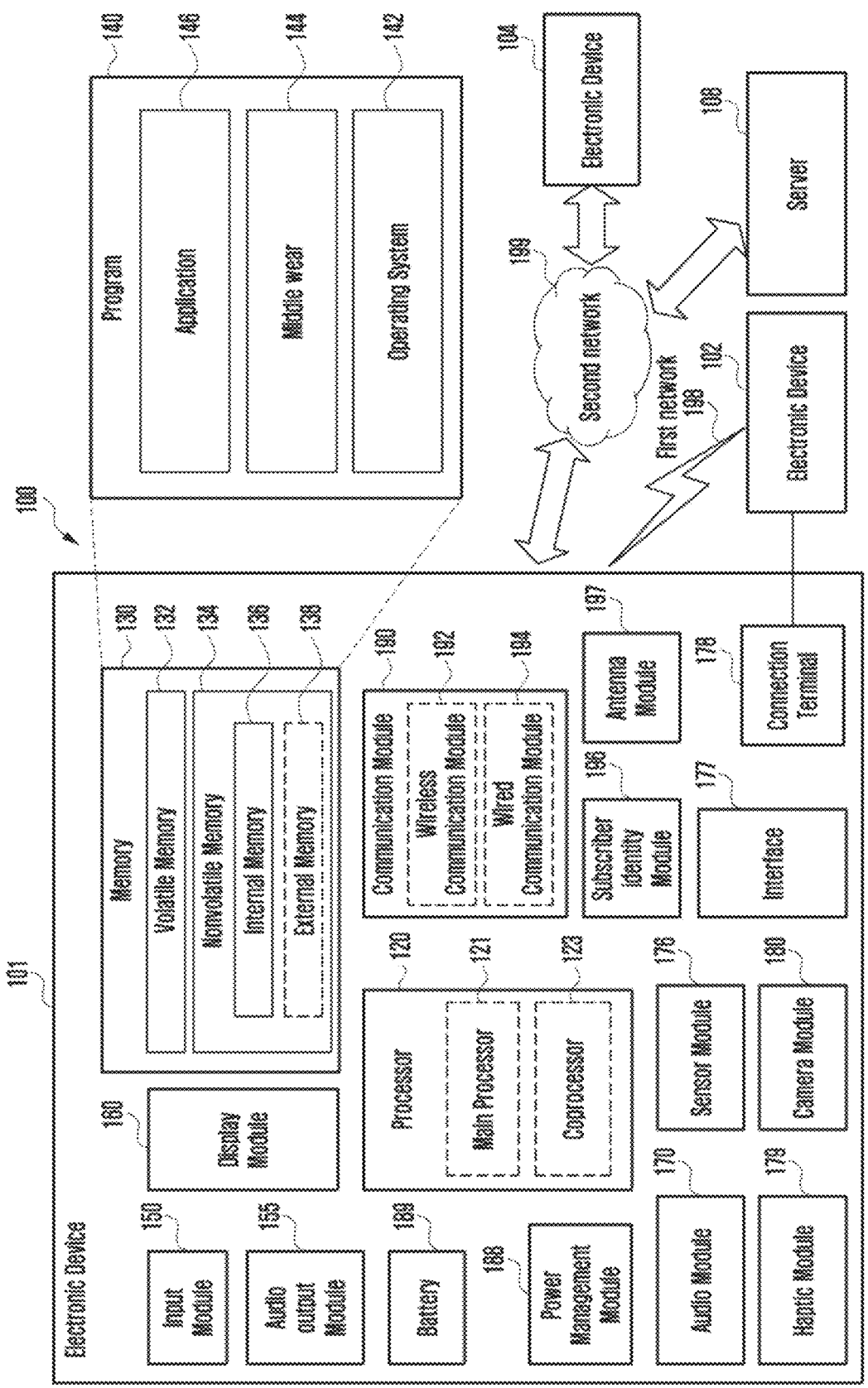
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
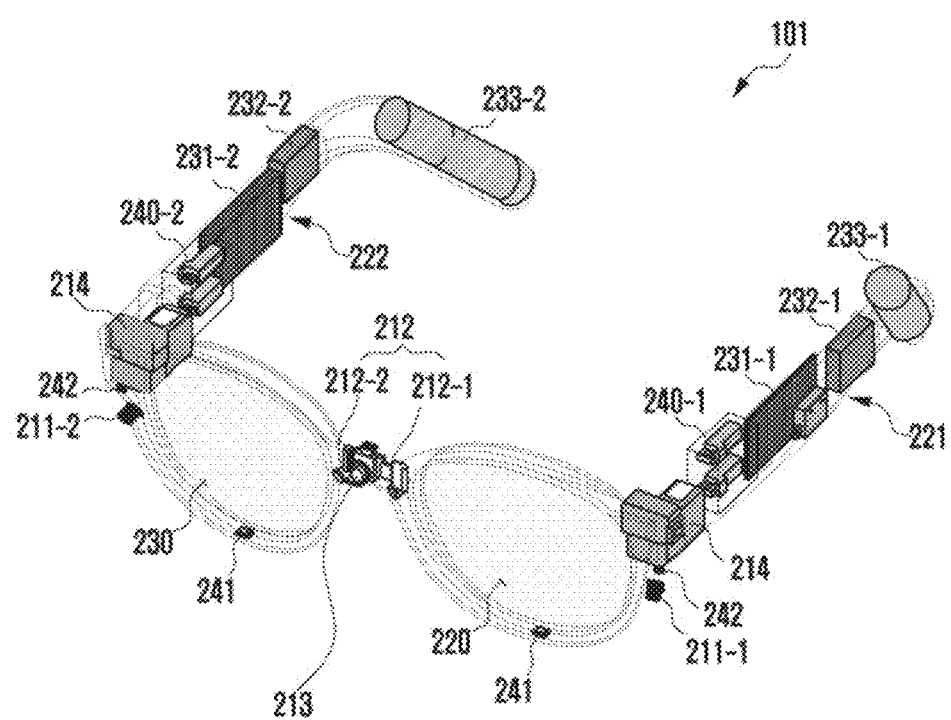
FIG. 2A is a diagram illustrating the entire configuration of an electronic device including multiple cameras according to various embodiments of the disclosure.
Figure 2B:
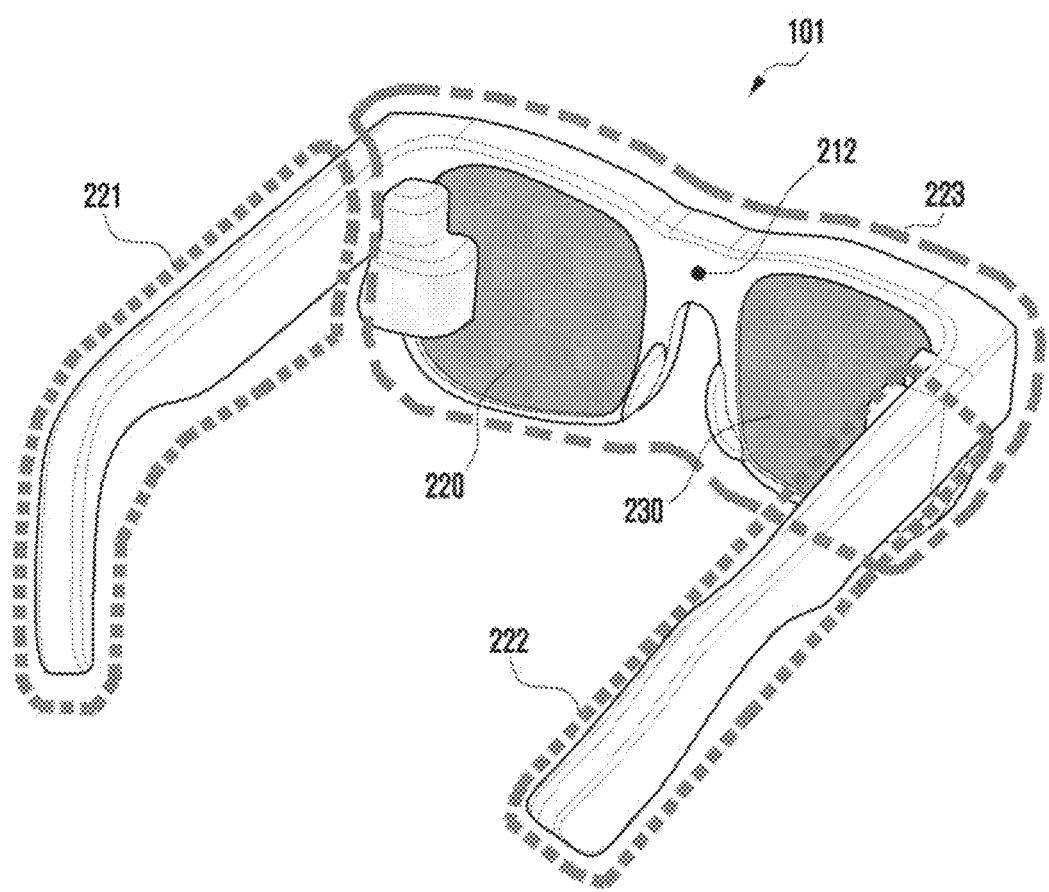
FIG. 2B is a diagram illustrating an example of a front surface of an electronic device according to various embodiments of the disclosure.

FIG. 2A is a diagram illustrating the entire configuration of an electronic device (e.g., the electronic device 101 in FIG. 1) including multiple cameras according to various embodiments of the disclosure. FIG. 2B is a diagram illustrating an example of a front surface of an electronic device according to various embodiments of the disclosure. FIG. 2B is a diagram illustrating an example of a front surface portion of the electronic device 101, and an internal configuration may be the same as a configuration illustrated in FIG. 2A.

In various embodiments, the electronic device 101 may be worn on a user's head portion to provide an image related to an augmented reality service to the user. According to an embodiment, the electronic device 101 may provide an augmented reality service of outputting at least one virtual object to be seen to overlap with a region determined as the user's field of view (FOV). For example, the region determined as the user's field of view is a region determined to be recognizable via the electronic device 101 by the user wearing the electronic device 101, and may be a region including the entirety or at least a part of a display module (e.g., the display module 160 in FIG. 1) of the electronic device 101. According to an embodiment, the electronic device 101 may include multiple glass members (e.g., a first glass member 220 and/or a second glass member 230) corresponding to both eyes of the user (e.g., the left eye and/or the right eye), respectively. The multiple glass members may include at least a part of a display module (e.g., a first display module 351 and/or a second display module 353 in FIG. 3). For example, the first display module 351 may be included in the first glass member 220 corresponding the user's left eye, and the second display module 353 may be included in the second glass member 230 corresponding to the user's right eye. For example, the electronic device 101 may be configured in at least one type among glasses, goggles, a helmet, or a hat, but is not limited thereto.

Referring to FIG. 2A, the electronic device 101 according to an embodiment may include a display module 214 (e.g., the display module 160 in FIG. 1), a camera module (e.g., the camera module 180 in FIG. 1), an audio module (e.g., the audio module 170 in FIG. 1), a first support part 221, and/or a second support part 222. According to an embodiment, the display module 160 may include a first display (e.g., the first glass member 220) (e.g., the first display module 351 in FIG. 3) and/or a second display (e.g., the second glass member 230) (e.g., the second display module 353 in FIG. 3). According to an embodiment, at least one camera may include a front camera 213 configured to capture an image corresponding to the user's field of view (FOV) and/or measure a distance to an object, an eye tracking camera 212 configured to identify the direction of a gaze of the user, and/or recognition cameras (gesture cameras) 211-1 and 211-2 configured to recognize a particular space. For example, the front camera 213 may capture an image in the forward direction of the electronic device 101, and the eye tracking camera 212 may capture an image in a direction opposite to the image capturing direction of the front camera 213. For example, the eye tracking camera 212 may at least partially capture an image of both eyes of the user. According to an embodiment, the first support part 221 and/or the second support part 222 may include printed circuit boards (PCBs) 231-1 and 231-2, speakers 232-1 and 232-2, and/or batteries 233-1 and 233-2.

According to an embodiment, the display module 160 (e.g., the display module 214 in FIG. 2A) may be disposed at a body part (e.g., a body part 223 in FIG. 2B) of the electronic device 101, and may include a focusing lens and/or a transparent waveguide tube in a glass member (e.g., the first glass member 220 and the second glass member 230). For example, the transparent waveguide tube may be at least partially positioned in a part of the glass member. According to an embodiment, light emitted from the display module 160 may enter into one end of each of the first glass member 220 and the second glass member 230 through the glass members, and the entered light may be transferred to the user through a waveguide tube and/or a waveguide passage (e.g., waveguide) formed in each of the glass members. The waveguide tube may be manufactured of glass, plastic, or polymer, and may include a nano pattern disposed on one inner or outer surface thereof, for example, a grating structure having a polygonal shape or a curved surface shape. According to an embodiment, the entered light may be provided to the user by being propagated or reflected in the waveguide passage by the nano pattern. According to an embodiment, the waveguide passage (waveguide) may include at least one of at least one diffractive element (e.g., a diffractive optical element (DOE) or a holographic optical element (HOE)) or reflective element (e.g., a reflective mirror)). According to an embodiment, the waveguide passage may induce display light emitted from a light source unit, to the user's eye by using at least one diffractive element or reflective element.

Referring to FIG. 2A, the first support part 221 and/or the second support part 222 may include the printed circuit boards 231-1 and 231-2 for transferring an electrical signal to each element of the electronic device 101, the speakers 232-1 and 232-2 for outputting an audio signal, the batteries 233-1 and 233-2, and/or hinge parts 240-1 and 240-2 for at least partial coupling to the body part 223 of the electronic device 101. According to an embodiment, the speakers 232-1 and 232-2 may include the first speaker 232-1 for transferring an audio signal to the user's left ear and the second speaker 232-2 for transferring an audio signal to the user's right ear. The speakers 232-1 and 232-2 may be included in the audio module 170 shown in FIG. 1. According to an embodiment, the electronic device 101 may include multiple batteries 233-1 and 233-2, and may supply power to the printed circuit boards 231-1 and 231-2 via a power management module (e.g., the power management module 188 in FIG. 1).

Referring to FIG. 2A, the electronic device 101 may include a microphone 241 configured to receive the user's voice and surrounding sounds. For example, the microphone 241 may be included in the audio module 170 shown in FIG. 1. The electronic device 101 may include at least one light emitting device (illumination LED) 242 for improving the accuracy of the at least one camera (e.g., the front camera 213, the eye tracking camera 212, and/or the recognition cameras 211-1 and 211-2). For example, the light emitting device 242 may be used as an auxiliary means for improving accuracy when an image of the user's pupil is captured by the eye tracking camera 212, and the light emitting device 242 may use an IR LED emitting infrared wavelength rather than visible wavelength. As another example, the light emitting device 242 may be used as an auxiliary means when it is not easy to detect a subject to be image-captured because of a dark environment or introduction of mixture of various light sources in a case where an image of the user's gesture is captured by the recognition cameras 211-1 and 211-2.

Referring to FIG. 2B, the electronic device 101 according to an embodiment may be configured by the body part 223 and a support part (e.g., the first support part 221 and/or the second support part 222), and the body part 223 and the support parts 221 and 222 may be operatively connected to each other. For example, the body part 223 and the support parts 221 and 222 may be operatively connected to each other by means of the hinge parts 240-1 and 240-2. The body part 223 may be at least partially placed on the user's nose, and may include the display module 160 and a camera module (e.g., the camera module 180 in FIG. 1). The support parts 221 and 222 may include support members placed on the user's ears, and may include the first support part 221 placed on the left ear and/or the second support part 222 placed on the right ear. According to an embodiment, the first support part 221 or the second support part 222 may at least partially include the printed circuit boards 231-1 and 231-2, the speakers 232-1 and 232-2, and/or the batteries 233-1 and 233-2 (e.g., the battery 189 in FIG. 1, or a first battery 333 and/or a second battery 343 in FIG. 3). The battery may be electrically connected to a power management module (e.g., the power management module 188 in FIG. 1).

According to an embodiment, the display module 160 may include the first glass member 220 and/or the second glass member 230, and may provide visual information to the user via the first glass member 220 and the second glass member 230. The electronic device 101 may include the first glass member 220 corresponding to the left eye and/or the second glass member 230 corresponding to the right eye. According to an embodiment, the display module 160 may include a display panel and/or a lens (e.g., a glass member). For example, the display panel may include a transparent material such as glass or plastic.

According to an embodiment, the display module 160 may be configured by a transparent element, and the user may recognize a real space behind the display module 160, which is transmitted through the display module 160. The display module 160 may display a virtual object on at least partial region of the transparent element so that the virtual object is seen to the user as being added to at least a part of the real space. The first glass member 220 and/or the second glass member 230 included in the display module 160 may include multiple display panels corresponding to both eyes of the user (e.g., the left eye and/or the right eye), respectively.

According to an embodiment, the electronic device 101 may include a virtual reality (VR) device. When the electronic device 101 is a VR device, the first glass member 220 may be the first display module 351, and the second glass member 230 may be the second display module 353.

According to an embodiment, a virtual object output via the display module 160 may include information related to an application program executed in the electronic device 101, and/or information related to an external object positioned in a real space corresponding to a region determined as the user's field of view (FOV). For example, the electronic device 101 may identify an external object included in at least a part corresponding to a region determined as the user's field of view (FOV) in image information related to a real space obtained via a camera (e.g., the front camera 213) of the electronic device 101. The electronic device 101 may output (or display) a virtual object related to the external object identified in the at least part, on a region determined as the user's field of view in a display region of the electronic device 101. The external object may include an object existing in the real space. According to various embodiments, a display region on which the electronic device 101 displays a virtual object may include a part (e.g., at least a part of a display panel) of a display module (e.g., the first display module 351 or the second display module 353). According to an embodiment, the display region may be a region corresponding to at least a part of the first glass member 220 and/or the second glass member 230.

According to an embodiment, the electronic device 101 may include the front camera 213 (e.g., red-green-blue (RGB) camera) configured to capture an image corresponding to the user's field of view (FOV) and/or measuring a distance to an object, the eye tracking camera 212 configured to identify the direction of a gaze of the user, and/or the recognition cameras (e.g., gesture cameras) 211-1 and 211-2 configured to recognize a particular space. According to an embodiment, the electronic device 101 may use the front camera 213 to measure a distance to an object positioned in the forward direction of the electronic device 101. According to an embodiment, the electronic device 101 may include multiple eye tracking cameras 212 arranged to correspond to both eyes of the user. For example, the eye tracking cameras 212 may capture an image in a direction opposite to the image capturing direction of the front camera 213. The eye tracking cameras 212 may sense the user's gaze direction (e.g., pupil movement). For example, the eye tracking cameras 212 may include a first eye tracking camera 212-1 configured to track the gaze direction of the user's left eye and a second eye tracking camera 212-2 configured to track the gaze direction of the user's right eye. According to an embodiment, the electronic device 101 may sense a user gesture within a pre-configured distance (e.g., a particular space) by means of the recognition cameras 211-1 and 211-2. For example, the electronic device may include multiple recognition cameras 211-1 and 211-2, which may be arranged at both sides of the electronic device 101.

According to an embodiment, the front camera 213 may include a camera having high resolution, such as a high resolution (HR) camera and/or a photo video (PV) camera. According to an embodiment, the eye tracking cameras 212 may detect the user's pupils to track gaze directions, and may be used to move the center of a virtual image to be moved according to the gaze directions. For example, the eye tracking cameras 212 may be distinguished into the first eye tracking camera 212-1 corresponding to the left eye and the second eye tracking camera 212-2 corresponding to the right eye, and may have substantially the same camera performance and/or specification. According to an embodiment, the recognition cameras 211-1 and 211-2 may be used to perform detection of the user's hand (gesture) and/or space recognition, and may include a global shutter (GS) camera. For example, the recognition cameras 211-1 and 211-2 may include a GS camera having little motion blur, such as a rolling shutter (RS) camera, in order to detect and track fast hand motions and/or fine finger movements.

According to an embodiment, the electronic device 101 may display a virtual object related to an augmented reality service, based on image information related to a real space obtained via a camera (e.g., the camera module 180 in FIG. 1) of the electronic device 101. According to an embodiment, the electronic device 101 may display the virtual object, based on display modules (e.g., the first display module 351 corresponding to the left eye and/or the second display module 353 corresponding to the right eye) arranged to correspond to both eyes of the user. According to an embodiment, the electronic device 101 may display the virtual object, based on pre-configured configuration information (e.g., resolution, frame rate, brightness, and/or display region).

According to an embodiment, the electronic device 101 may operate a first display panel included in the first glass member 220 and a second display panel included in the second glass member 230 as independent configuration parts, respectively. For example, the electronic device 101 may determine a display performance of the first display panel, based on first configuration information, and determine a display performance of the second display panel, based on second configuration information.

The number and the position of the at least one camera (e.g., the front camera 213, the eye tracking camera 212, and/or the recognition cameras 211-1 and 211-2) included in the electronic device 101 illustrated in FIG. 2A and FIG. 2B may not be limited. For example, the number and the position of the at least one camera (e.g., the front camera 213, the eye tracking camera 212, and/or the recognition cameras 211-1 and 211-2) included in the electronic device 101 may vary according to a type (e.g., shape or size) of the electronic device 101.

Figure 3:
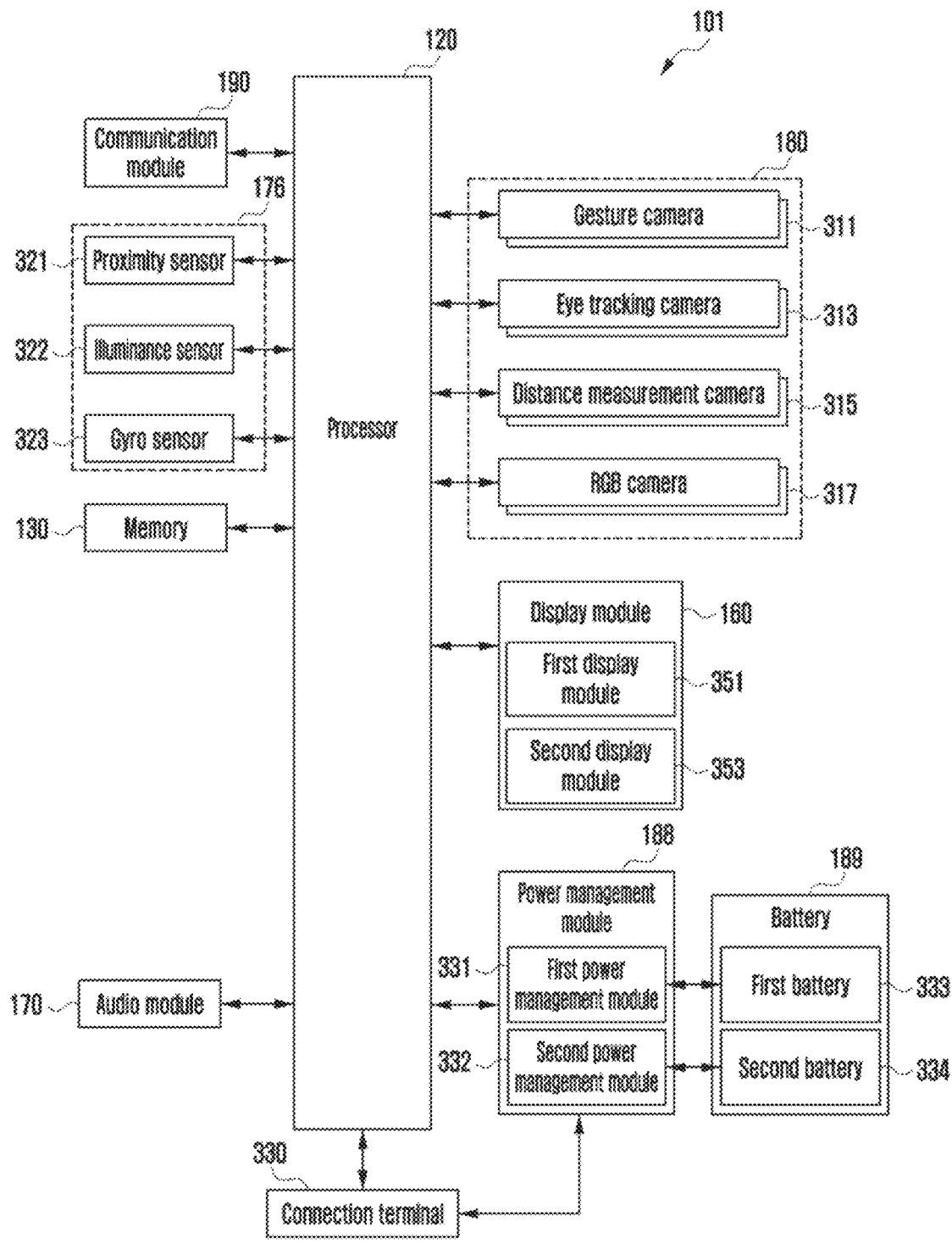
FIG. 3 is a block diagram of an electronic device according to various embodiments.

FIG. 3 is a block diagram of an electronic device according to various embodiments.

Referring to FIG. 3, the electronic device 101 may include the processor 120 (e.g., the processor 120 in FIG. 1), the memory 130 (e.g., the memory 130 in FIG. 1), the display module 160 (e.g., the display module 160 in FIG. 1), the audio module 170 (e.g., the audio module 170 in FIG. 1), the sensor module 176 (e.g., the sensor module 176 in FIG. 1), the camera module 180 (e.g., the camera module 180 in FIG. 1), the power management module 188 (e.g., the power management module 188 in FIG. 1), the battery 189 (e.g., the battery 189 in FIG. 1), and/or a communication module (e.g., the communication module 190 in FIG. 1). According to an embodiment, the electronic device 101 may be connected to an external electronic device (not illustrated) via a connection terminal 330 (e.g., USB TYPE-C). For example, the power management module 188 of the electronic device 101 may receive power from an external electronic device via the connection terminal 330 and charge the battery 189. As another example, the processor 120 of the electronic device 101 may perform power line communication with an external electronic device via the connection terminal 330. According to an embodiment, the electronic device 101 may be configured by a body part (e.g., the body part 223 in FIG. 2B) and a support part (e.g., the first support part 221 and/or the second support part 222 in FIG. 2B). According to an embodiment, elements of the electronic device 101 may be arranged at the body part 223 or the support parts 221 and 222.

According to an embodiment, the processor 120 may execute a program (e.g., the program 140 in FIG. 1) stored in the memory 130 to control at least one element (e.g., a hardware or software element), and perform various data processing or calculation. According to an embodiment, the processor 120 may provide an augmented reality service to a user. The processor 120 may output at least one virtual object via the display module 160 such that the at least one virtual object is seen to be added to a real space corresponding to the field of view of a user wearing the electronic device 101.

According to an embodiment, the display module 160 of the electronic device 101 may include at least one glass member (e.g., a first glass member (e.g., the first glass member 220 in FIG. 2A) and/or a second glass member (e.g., the second glass member 230 in FIG. 2A). According to an embodiment, the first glass member 220 may include at least a part of the first display module 351, and the second glass member 230 may include at least a part of the second display module 353. For example, each of the first display module 351 and/or the second display module 353 may include a display panel. The display panel may be configured by a transparent element so that the user can recognize a real space via the display module 160. The display module 160 may display at least one virtual object on at least a part of the display panel so that the virtual object is seen to the user wearing the electronic device 101 as being added to a real space. For example, a user's viewing angle may include an angle and/or a range allowing the user to recognize objects. According to an embodiment, the display module 160 may include the first display module 351 corresponding to the left eye of the user and/or the second display module 353 corresponding to the right eye of the user. According to an embodiment, the processor 120 may load, from the memory 130, configuration information (e.g., resolution, frame rate, size of display region, and/or sharpness) related to the performance of the display module 160, and may adjust the performance of the display module 160, based on the configuration information. According to an embodiment, configuration information may be individually determined with respect to each display panel included in the display module 160. For example, the first display panel corresponding to the left eye may be configured based on first configuration information, and the second display panel corresponding to the right eye may be configured based on second configuration information. According to another embodiment, the configuration information may differently configure at least a part of one display panel included in the display module 160. For example, the electronic device 101 may differently configure at least one of the resolution, the frame rate, and/or the sharpness of the display module 160. According to an embodiment, the electronic device 101 may at least partially change a configuration of the display module 160 so as to reduce power consumption.

According to an embodiment, the audio module 170 may convert sound into an electrical signal, or conversely may convert an electrical signal into sound, based on a control of the processor 120. For example, the audio module 170 may include the speakers 232-1 and 232-2 in FIG. 2A and/or the microphone 241 in FIG. 2A.

According to an embodiment, the sensor module 176 of the electronic device 101 may include a proximity sensor 321, an illuminance sensor 322, and/or a gyro sensor 323. According to an embodiment, the proximity sensor 321 may sense an object adjacent to the electronic device 101. The illuminance sensor 322 may measure a brightness level around the electronic device 101. According to an embodiment, the processor 120 may identify a brightness level around the electronic device 101 by means of the illuminance sensor 322, and change brightness-related configuration information of the display module 160, based on the brightness level. For example, when a surrounding brightness is higher than a pre-configured brightness, the processor 120 may configure the display module 160 to have a higher brightness level so as to increase the user's visibility. According to an embodiment, the gyro sensor 323 may sense the posture and the position of the electronic device 101. For example, the gyro sensor 323 may sense whether the electronic device 101 is correctly worn on the user's head. As another example, the gyro sensor 323 may sense the movement of the electronic device 101, or the movement of the user wearing the electronic device 101.

According to an embodiment, the electronic device 101 may perform wireless communication with another electronic device (e.g., the electronic device 102 or 104 in FIG. 1) via the communication module 190 (e.g., a wireless communication circuit). For example, the electronic device 101 may perform wireless communication with a portable electronic device (e.g., smartphone), and exchange an instruction and/or data with each other. According to an embodiment, the electronic device 101 may be at least partially controlled by another external electronic device (e.g., a portable electronic device). For example, at least one function of the electronic device 101 may be performed under control of another external electronic device.

According to various embodiments, the electronic device 101 may change at least a part of a configuration of a display panel, based on a control of a second electronic device (e.g., the electronic device 102 or 104 in FIG. 1) connected to the electronic device by wire or wirelessly. According to an embodiment, the electronic device 101 may transmit, to the second electronic device, fixating eye/assisting eye-related information (e.g., information on a distance to an object positioned in a real space, the user's eye tracking information, or the user's gesture information) obtained via a camera (e.g., the camera module 180 in FIG. 1) of the electronic device 101. The second electronic device may transmit, to the electronic device 101, configuration information of a display panel included in a glass member (e.g., the first glass member 220 and/or the second glass member 230) corresponding to a detected fixating eye or assisting eye, based on the fixating eye/assisting eye-related information received from the electronic device 101. The electronic device 101 may change at least a part of a configuration of the display panel, based on the configuration information of the display panel received from the second electronic device. For example, the configuration of the display panel may be changed to lower the quality of the display panel, and at least a part of the configuration may be changed by an extent that the user cannot feel. According to an embodiment, the electronic device 101 may reduce the resolution of the display panel, reduce the frame rate thereof, or adjust the size and position of a display region of the display panel.

According to an embodiment, the camera module 180 of the electronic device 101 may include a gesture camera 311, an eye tracking camera 313, a distance measurement camera (depth camera) 315, and/or an RGB camera 317. According to an embodiment, the gesture camera 311 may sense the user's movement. The recognition cameras 211-1 and 211-2 illustrated in FIG. 2A may include the gesture camera 311. For example, at least one gesture camera 311 may be disposed at the electronic device 101, and may sense the user's hand movement within a pre-configured distance. The gesture camera 311 may include a simultaneous localization and mapping (SLAM) camera for recognizing information (e.g., position and/or direction) related to a peripheral space of the electronic device. A gesture recognition region of the gesture camera 311 may be configured based on an image capturing available range of the gesture camera 311. According to an embodiment, the eye tracking camera 313 (e.g., the eye tracking camera 212 in FIG. 2A) may track the movement of the user's left and right eyes. According to an embodiment, the processor 120 may use the eye tracking camera 313 to identify the gaze direction of the left eye and the gaze direction of the right eye. For example, the eye tracking camera 313 may include the first eye tracking camera 212-1 configured to identify the gaze direction of the left eye and the second eye tracking camera 212-2 configured to identify the gaze direction of the right eye. According to an embodiment, the processor 120 may determine a fixating eye and an assisting eye, based on the gaze direction of the left eye and the gaze direction of the right eye. According to an embodiment, the distance measurement camera 315 may measure a distance to an object positioned in front of the electronic device 101. The image capturing camera 213 illustrated in FIG. 2A may include the distance measurement camera 315. The distance measurement camera 315 may include a time of flight (TOF) camera and/or a depth camera. According to an embodiment, the distance measurement camera 315 may capture an image in the forward direction of the electronic device 101, and the eye tracking camera 313 may capture an image in a direction opposite to the image capturing direction of the distance measurement camera 315. According to another embodiment, the electronic device 101 may measure a distance to an object by using the distance measurement camera 315, and when the distance is equal to or greater than a threshold value, change a configuration of a display panel. For example, when a distance to an object is a close distance to be equal to or smaller than the threshold value, the electronic device 101 may maintain a display performance of a display panel. According to an embodiment, the electronic device 101 may recognize, by means of the eye tracking camera 313, one of objects positioned in the gaze direction (e.g., FOV) in which the user looks, and may obtain the distance to the object by calculating (obtaining) a depth via the depth camera or measuring a distance via the TOF camera. According to an embodiment, the red green blue (RGC) camera 317 may sense color-related information of an object and information on a distance to the object. According to an embodiment, the electronic device 101 may integrate the distance measurement camera 315 with the RGB camera 317 so as to include one type of camera. For example, the image capturing camera 213 illustrated in FIG. 2A may include the distance measurement camera 315 and/or the RGB camera 317. According to an embodiment, each of the gesture camera 311, the eye tracking camera 313, the distance measurement camera 315, and/or the RGB camera 317 included in the camera module 180 may be included in the electronic device 101, or some of them may be implemented into an integrated type camera. For example, the distance measurement camera 315 and the RGB camera 317 may be implemented into one integrated type camera.

According to an embodiment, the power management module 188 may manage power supplied to the electronic device 101. The power management module 188 may include multiple power management modules (e.g., a first power management module 331 and a second power management module 332). At least a part of the first power management module 331 or the second power management module 332 may be directly connected to the processor 120, so as to supply power. At least a part of the first power management module 331 or the second power management module 332 may receive power from an external electronic device through the connection terminal 330 (e.g., TYPE-C), so as to charge the battery 189 or supply power to other elements of the electronic device 101. According to an embodiment, the electronic device 101 may receive power from an external electronic device in a wireless charging scheme, so as to charge the battery 189. According to an embodiment, the power management module 188 may be electrically connected to elements (e.g., the memory 130, the display module 160, the audio module 170, the sensor module 176, the camera module 180, and/or the communication module 190) of the electronic device 101. For example, the power management module 188 may provide power of the battery 189 to elements of the electronic device 101, based on a control of the processor 120. According to an embodiment, the electronic device 101 may receive power from the first battery 333 via the first power management module 331, and receive power from the second battery 334 via the second power management module 332. According to an embodiment, the processor 120 may at least partially change a configuration of the display module 160, based on information obtained using the at least one camera 311, 313, 315, and 317 included in the camera module 180, so as to manage consumed power.

According to an embodiment, under a control of the power management module 188, the battery 189 may be charged by being supplied with power or discharged by providing power. According to an embodiment, the battery 189 may include multiple batteries (e.g., the first battery 333 and the second battery 343). For example, the multiple batteries (e.g., the first battery 333 and the second battery 343) may be arranged at the body part 223 and the support parts (e.g., the first support part 221 and/or the second support part 222). According to an embodiment, the first battery 333 may be disposed at the first support part 221, and the second battery 343 may be disposed at the second support part 222.

Figure 4:
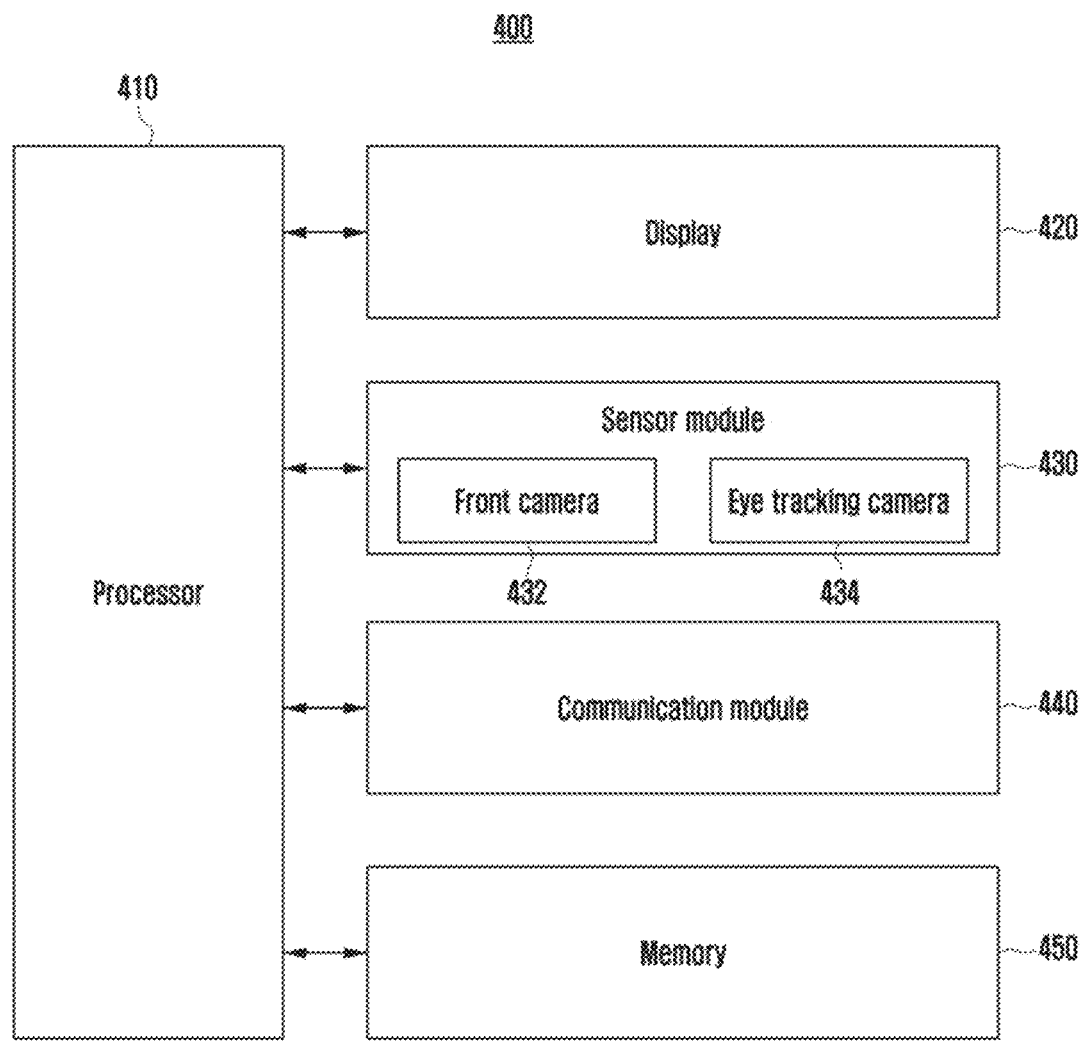
FIG. 4 is a block diagram of an electronic device according to various embodiments.

FIG. 4 is a block diagram of an electronic device according to various embodiments.

Referring to FIG. 4, an electronic device 400 may include a display 420, a sensor module 430, a communication module 440, a processor 410, and a memory 450, and in various embodiments, some of the illustrated elements may be omitted or replaced. The electronic device 400 may further include at least some of elements and/or functions of the electronic device 101 in FIG. 1. At least some of the elements of the electronic device 400 may be operatively, functionally, and/or electrically connected to each other.

According to various embodiments, the display 420 may display various images according to a control of the processor 410. The display 420 may be implemented by one of a liquid crystal display (LCD), a light-emitting diode (LED) display, a micro LED display, a quantum dot (QD) display, or an organic light-emitting diode (OLED) display, but embodiments are not limited thereto. The display 420 may be implemented by a touch screen for sensing an input of a touch and/or a proximity touch (or hovering) made by using a part (e.g., a finger) of a user's body or by an input device (e.g., a stylus pen). The display 420 may include at least some of elements and/or functions of the display module 160 in FIG. 1.

According to various embodiments, the display 420 may be at least partially flexible, and may be implemented by a foldable display or a rollable display.

According to various embodiments, the sensor module 430 (e.g., the sensor module 176 in FIG. 1) may sense an operation state (e.g., power or temperature) of the electronic device 101 or an external environment state (e.g., the user's state), and generate an electrical signal or a data value corresponding to the sensed state. According to an embodiment, the sensor module 430 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to various embodiments, the sensor module 430 may include at least one camera. For example, the sensor module 430 may include at least one of an eye tracking camera 434 configured to track the user's gaze, and a front camera 432 for recognizing an object in front of the electronic device 400.

According to various embodiments, the communication module 440 may communicate with an external device via a wireless network according to a control of the processor 410. The communication module 440 may include hardware and software modules for transmitting or receiving data to or from a cellular network (e.g., long term evolution (LTE) network, 5G network, or new radio (NR) network) and a short-range network (e.g., Wi-Fi or Bluetooth). The communication module 440 may include at least some of elements and/or functions of the communication module 190 in FIG. 1.

According to various embodiments, the memory 450 may include a volatile memory (e.g., the volatile memory 132 in FIG. 1) and a non-volatile memory (e.g., the non-volatile memory 134 in FIG. 1) so as to temporarily or permanently store various data. The memory 450 may include at least some of elements and/or functions of the memory 130 in FIG. 1, and store the program 140 in FIG. 1.

According to various embodiments, the memory 450 may store various instructions executable by the processor 410. Such instructions may include control commands such as arithmetic and logical operations, data transfer, or input/output which can be recognized by the processor 410.

According to various embodiments, the processor 410 may be operatively, functionally, and/or electrically connected to elements (e.g., the display 420, the sensor module 430, the communication module 440, and the memory 450) of the electronic device 400 so as to perform calculation or data processing related to control and/or communication of the elements. The processor 410 may include at least some of elements and/or functions of the processor 120 in FIG. 1.

According to various embodiments, there may be no limit to calculation and data processing functions which can be implemented by the processor 410 on the electronic device 400. However, hereinafter, various embodiments for determining a display method of content when an object in front of the electronic device 400 is sensed will be described. Operations of the processor 410 described later may be performed by loading instructions stored in the memory 450.

According to various embodiments, the processor 410 may output content on the display 420. Content which can be output on the display 420 by the processor 410 may correspond to, for example, an image, a movie, an animation, a game, a video, and an execution screen of various applications provided by the electronic device 400. The processor 410 may output content on the user's field of view in the display 420, and may output content on at least partial region in the user's field of view. When content output by the processor 410 is an image having a particular size and is reproducible and stoppable, the processor 410 may reproduce or stop the content output thereby according to a predetermined condition. For example, the processor 410 may temporarily stop content which is being currently reproduced, while minimizing the size of the content and then moving the content to one side of the display 420.

According to various embodiments, the processor 410 may recognize at least one object positioned within the user's field of view. The processor 410 can recognize one or multiple objects. According to an embodiment, the processor 410 may recognize and register at least one object. The processor 410 may store information on the registered object in the memory 450. According to an embodiment, the processor 410 may recognize an object within the user's field of view only when the object is pre-registered.

According to various embodiments, the processor 410 may obtain the user's gaze dwell time for the recognized object. The processor 410 may obtain information on the user's gaze from the eye tracking camera 434. The gaze information may include a gaze dwell time which is a time the user stares at one or more objects. The processor 410 can recognize multiple objects, and thus may obtain multiple gaze dwell times from the eye tracking camera 434. For example, the processor 410 may obtain a first gaze dwell time for a first object and a second gaze dwell time for a second object. According to an embodiment, the processor 410 may obtain a gaze dwell time only when a recognized object is pre-registered. For example, when the processor 410 has registered the first object and the second object, and the first object, the second object, and a third object are positioned at the front, the processor 410 may obtain a first gaze dwell time for the first object and a second gaze dwell time for the second object and may not recognize the third object.

According to various embodiments, the processor 410 may determine whether the user's gaze dwell time for an object is equal to or greater than a reference time (e.g., one second). The processor 410 may determine a reference time for gaze dwell time. The reference time may be long enough for the user not to recognize an object the user is not focusing on, and may be short enough for the user to quickly recognize an object the user is focusing on. When the user's gaze dwell time for an object is equal to or greater than the reference time, the processor 410 may determine that the user has recognized the object.

According to various embodiments, the processor 410 may calculate (obtain) the area of an object within a field of view of the front camera 432. The processor 410 may obtain an image of a situation in front of the electronic device 400 from the front camera 432. The processor 410 may identify an image of an object included in the image, and calculate the area of the object, based on a ratio of the number of pixels assigned to the image of the object to the entire resolution.

According to various embodiments, the processor 410 may output content in various types, based on information obtained from the sensor module 430. Hereinafter, a method of outputting, by the processor 410, content, based on information obtained from the sensor module 430 will be described in detail. According to various embodiments, the processor 410 may output content, based on the measured area. When an area occupied by an object in the field of view of the front camera 432 is smaller than a predetermined area, the processor 410 may output content on a region having no overlap with the object. When an area occupied by an object is smaller than the predetermined area, the processor 410 may determine that the user can recognize the object even when only a partial region of content that is being currently output is removed. When the processor 410 has removed only a partial region of content, the user may recognize an object that appeared within the field of view thereof, while continuously watching content that the user has been watching (or using). According to an embodiment, the processor 410 may remove content on a region on which an object is positioned in a field of view. For example, when an object is positioned on a first region while the processor 410 is outputting content on a second region including the first region, the processor 410 may output the content on a region remaining after excluding only the first region from the second region. According to another embodiment, the processor 410 may reposition content so that there is no region on which an object and the content overlap with each other. For example, the processor 410 may move content that is being output on the second region, to a third region having no overlap with the first region. According to an embodiment, the processor 410 may adjust the size of content while repositioning the content. For example, the processor 410 may reduce the size of content and output the content while moving the content to the third region having no overlap with an object.

According to various embodiments, when an area of an object is equal to or greater than a predetermined area, the processor 410 may reduce the size of content and output the content on one side of the display 420. When an area occupied by an object within a field of view is equal to or greater than the predetermined area, it may be difficult for the user to simultaneously recognize the object and content that the user has been watching (or using). In this case, the processor 410 may reduce and output the content on one side of the display 420, thereby providing a display environment in which the user is able to recognize the object. According to an embodiment, the processor 410 may configure the predetermined area to be small enough for the user to watch content without being interrupted. According to an embodiment, the processor 410 may temporarily stop the reproduction of content while reducing the size of the content. When the size of content is reduced, the user may have difficulty to use the content in a way the user has used the content. Therefore, the processor 410 may temporarily stop the reproduction of content while reducing the size of the content, so as to provide the user's convenience. When an object disappears in a field of view, or when an area occupied by the object within the field of view becomes smaller, the processor 410 may enlarge content to an original size, and reproduce the content.

According to various embodiments, the processor 410 may control an output type of content in real time. According to an area occupied by an object within a field of view, the processor 410 may change the size of content in real time, reposition the content, or not output the content in a partial region. For example, when an area occupied by an object becomes larger to be equal to or greater than a predetermined area while content is output on a region remaining after excluding a region on which the object is positioned, the processor 410 may reduce the size of the content and output the content on one side of the display 420. Thereafter, when the area occupied by the object becomes smaller, the processor may enlarge the size of the content to an original size, and output the content on a region remaining after excluding a region on which the content and the object overlap with each other.

According to various embodiments, the processor 410 may output content, based on the position of an object within a field of view. According to various embodiments, the processor 410 may configure a field of view of the front camera 432 to include a center region and an edge region. The processor 410 may output content according to whether an object is positioned in the center region or the edge region on the field of view.

According to various embodiments, the processor 410 may determine an importance level of content, and output the content, based on the determined importance level. The processor 410 may determine the importance level, based on a function executed in the content. For example, the processor 410 may configure a high importance level for content, such as a navigation application, which may cause a danger to the user when being stopped during ongoing execution. The processor may configure a low importance level for content, such as movie content or streaming content, which does not cause a danger to the user even when being stopped during reproduction. According to an embodiment, when an object is sensed while content having a high importance level is being reproduced, the processor 410 may not reduce the size of the reproduced content or may simultaneously display the object and the content. According to an embodiment, when content having a low importance level is being reproduced, the processor 410 may determine an output type of the content, based on the size of an area occupied by an object.

According to various embodiments, the processor 410 may sense a gesture and a movement to recognize an object. The processor 410 may recognize a predetermined gesture by the front camera 432. When a predetermined gesture is recognized, the processor 410 may determine that the user is recognizing an object, without obtaining a gaze dwell time for the object. For example, when the processor 410 configures, as the predetermined gesture, a gesture of shaking an object to the left and right, and recognizes an object shaking to the left and right within a field of view of the front camera 432, the processor may determine that the user is recognizing the object, even when the user is not gazing at the object. The processor 410 may recognize a gesture to reduce a resource required for gaze tracking.

According to various embodiments, the processor 410 may map a unique gesture to each object and store same. The processor 410 may configure different unique gestures for types of objects, respectively, without configuring only one gesture, and when a particular gesture is recognized, may recognize an object mapped to the gesture. For example, the processor 410 may map a gesture of flipping the wrist to a first object (e.g., a smart watch), and store same. Thereafter, when a gesture of flipping the wrist is recognized, the processor 410 may determine that the user recognizes the first object.

According to various embodiments, the processor 410 may output content according to the number of hands with which the user holds an object. The processor 410 may recognize an object and hands with which the user holds the object by means of the front camera 432. According to an embodiment, when the user holds an object with two hands, the processor 410 may determine that the user is focusing on the object, reduce the size of content, and output the content on one side of the display 420. According to an embodiment, when the user holds an object with one hand, the processor 410 may determine an output type of content, based on factors, such as an area and position occupied by the object within a field of view of the front camera 432.

According to various embodiments, the processor 410 may establish a communication link with an object by means of the communication module 440. According to an embodiment, the processor 410 may establish a communication link with at least one object and store same in the memory 450. According to an embodiment, an object located in front of the electronic device 400 may be an external device capable of communicating with the electronic device 400. The processor 410 may establish a communication link with the external device, and identify whether the external device is a pre-registered object.

According to various embodiments, the processor 410 may output a message user interface (UI) including information related to an object connected thereto by communication. The processor 410 may obtain, from the memory 450, the information related to an object connected thereto by communication. The processor 410 may output a message UI including information on an object at one side of a region on a field of view, which displays the object. According to various embodiments, when an object is not a pre-registered object, the processor 410 may search for the object to obtain information on the object, and display a message UI including the information.

According to various embodiments, the processor 410 may recognize multiple objects located within a field of view. For example, the processor 410 may recognize multiple objects including a first object and a second object. The processor 410 may obtain a first gaze dwell time for the first object and a second gaze dwell time for the second object.

The processor 410 may determine an object of interest including at least one, which the user is interested in, of the first object and the second object, based on the first gaze dwell time and the second gaze dwell time. For example, when the first gaze dwell time is equal to or greater than a reference time, and the second gaze dwell time is less than the reference time, the processor 410 may configure only the first object, as the object of interest. When the first gaze dwell time and the second gaze dwell time are both equal to or greater than a reference time, the processor 410 may configure both the first object and the second object, as the objects of interest. According to various embodiments, the processor 410 may determine an output type of content, based on the size of an area occupied by an object of interest within a field of view. For example, when the first object and the second object are objects of interest, the processor 410 may determine whether the size of an area obtained by adding a first area of the first object to a second area of the second object is equal to or greater than that of a predetermined area.

According to various embodiments, the processor 410 may configure an object of interest. The processor 410 may configure at least one object as an object of interest, based on a user input, and recognize the object configured as the object of interest via the front camera 432. According to an embodiment, an object of interest may be unable to be connected to the electronic device 404 by communication, and the processor 410 may recognize the object of interest by identifying a visual characteristic thereof.

According to various embodiments, when an object of interest and content overlap with each other, the processor 410 may change the transparency level of the content. The processor 410 may change the transparency level of the content, thereby providing, to the user, a notification indicating that the object of interest is located at the front. According to an embodiment, the processor 410 may provide information on an object of interest. For example, the processor 410 may provide visual/auditory information indicating an object of interest. For example, when content is outputting visual information and auditory information together, the processor 410 may provide only visual information on an object of interest, and when content is outputting only visual information, the processor may provide visual and auditory information on an object of interest. For example, the processor 410 may provide a photograph including an object of interest. The processor 410 may identify whether there is an object of interest in a photograph stored in the electronic device 400, and when there is a photograph including the object of interest, may output the photograph on the display 420.

According to various embodiments, the processor 410 may display an object of interest or content on the display 420, based on a predetermined switch event. The switch event may include the user's touch on the electronic device 400, the user's click thereon, and the user's touch input on an external device connected to the electronic device 400 by communication. The processor 410 may receive a switch event, output content on the display 420 or minimize and display the content on one side of the display 420, and output information on an object of interest. According to an embodiment, when information on an object of interest is not output and content is output, the processor 410 may change the brightness of the information on the object of interest to be dark, and not output the information after passage of a predetermined time.

According to various embodiments, the processor 410 may output content at an initial value when the user's gaze dwell time for an object is less than a reference time. The processor 410 may obtain a gaze dwell time for an object, and when the time for which the user stares at the object is less than a reference time, may output content at an initial value. According to an embodiment, the processor 410 may differently configure a time used to determine that the user recognizes content, and a time used to determine that the user does not recognize content any longer.

Figure 5A:
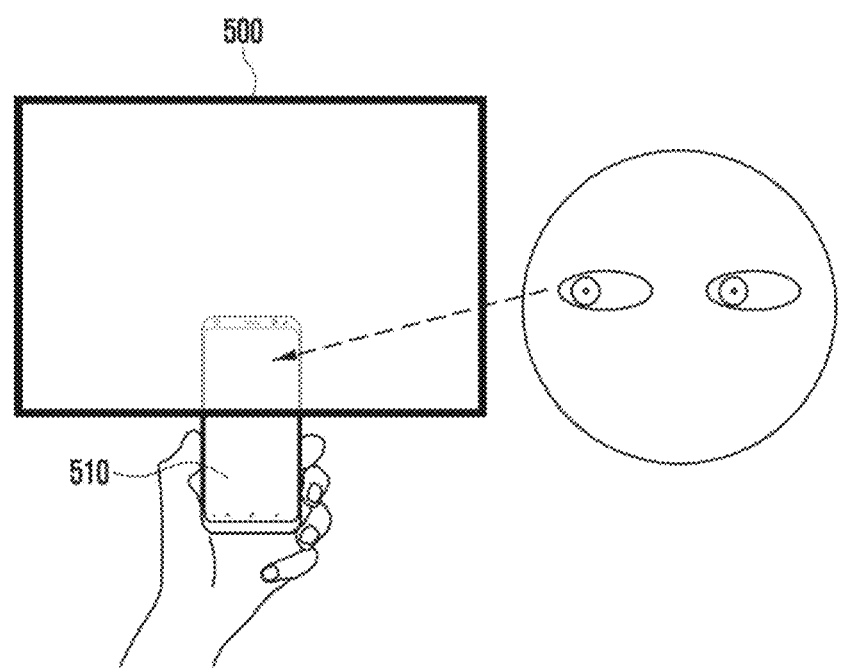
FIGS. 5A and 5B are diagrams illustrating measurement of a gaze dwell time according to various embodiments.
Figure 5B:
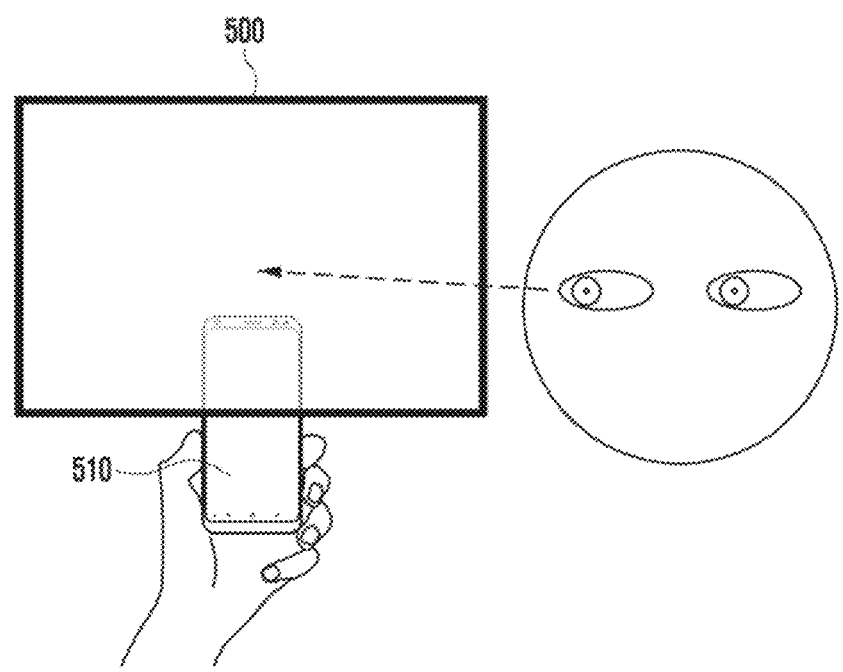

FIGS. 5A and 5B is a diagram illustrating measurement of a gaze dwell time according to various embodiments.

Referring to FIGS. 5A and 5B, a processor (e.g., the processor 410 in FIG. 4) may measure a gaze dwell time by means of a front camera (e.g., the front camera 432 in FIG. 4) and an eye tracking camera (e.g., the eye tracking camera 434 in FIG. 4). According to various embodiments, the processor may recognize an object 510 located in front of an electronic device by means of the front camera. The processor may recognize the user's pupil movement by means of the eye tracking camera, and determine, based on the position of the object 510 obtained from the front camera, which object the user looks at. For example, referring to FIG. 5A, the processor may recognize, by means of the front camera, that the object 510 is positioned on a field of view 500 of the front camera, and may identify, by means of the eye tracking camera, that a user is staring at the object 510. The processor may measure the user's gaze dwell time for the object 510.

According to various embodiments, the processor may change an output type of content, based on the user's gaze dwell time. The processor may configure a reference time suitable for recognition of the object 510 which the user stares at. According to various embodiments, the processor may change an output type of content, based on the gaze dwell time and the reference time. For example, when the gaze dwell time is less than the reference time, the processor may output content at an initial value, and when the gaze dwell time is equal to or longer than the reference time, the processor may change the size of the content or reposition the content, based on an area occupied by the object 510 in the field of view 500 of the front camera.

According to various embodiments, even in a case where the object 510 is positioned within the field of view 500 of the front camera, when the user does not stare at the object 510, the processor may not recognize same. For example, referring to FIG. 5B, although the object 510 is positioned within the field of view 500, the user does not stare at the object 510. The processor may obtain, from the eye tracking camera, information indicating that the user does not stare at the object 510, and may not change an output type of content.

According to various embodiments, when the user does not look at the object 510 after the output type of the content is changed, the processor may output the content at an initial value. For example, after the processor reduces the size of the content and then displays the content on one side of a display (e.g., the display 420 in FIG. 4), when the gaze dwell time is less than the reference time because the user does not stare at the object 510, the processor may restore the size and position of the content to an original size and position, and output the content. The processor may change the size and position of content according to a position at which and a time for which the user gazes, thereby providing an output screen matching the user's intent.

Figure 6A:
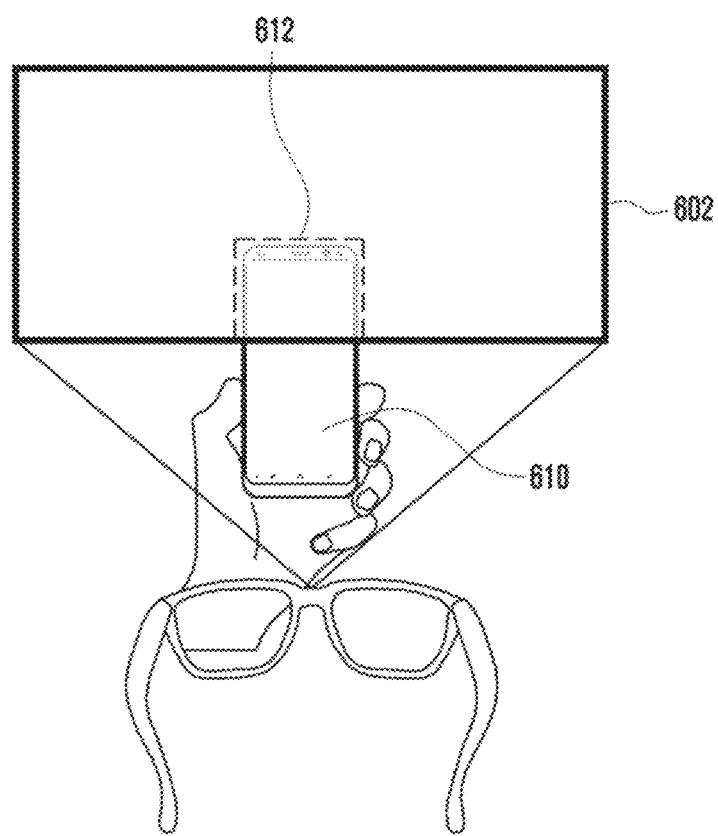
FIG. 6A and FIG. 6B are diagrams illustrating repositioning of content by an electronic device according to various embodiments.
Figure 6B:
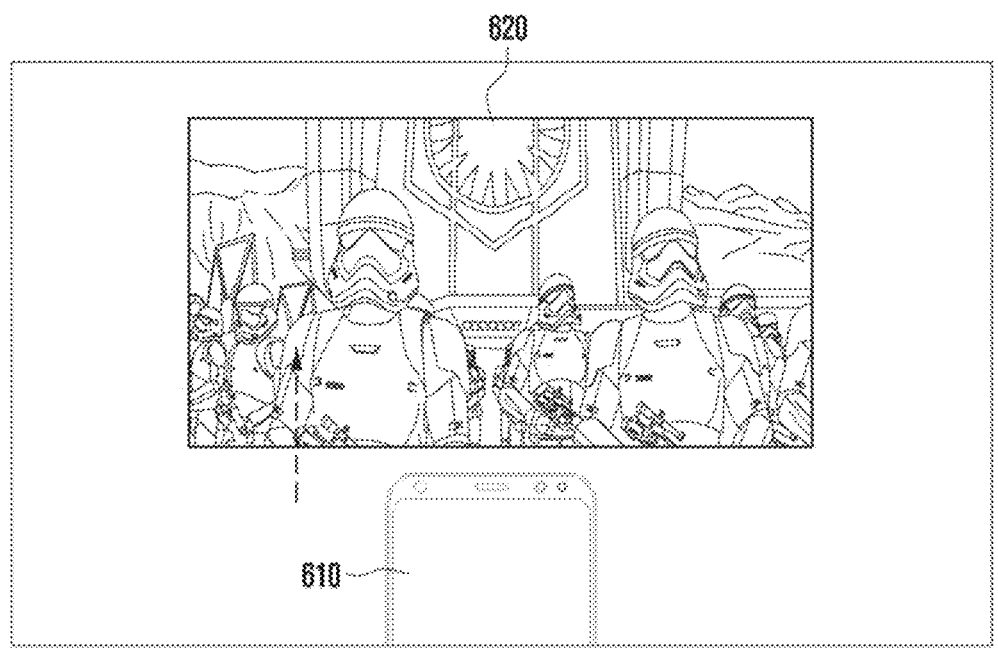

FIG. 6A and FIG. 6B are diagrams illustrating repositioning of content by an electronic device according to various embodiments.

According to various embodiments, when an area 612 occupied by content 620 in a field of view 602 is smaller than a predetermined area, a processor (e.g., the processor 410 in FIG. 4) may output the content 620 on a region having no overlap with an object. The processor may recognize the object positioned on the field of view 602 and recognize that the user is looking at the object, by means of a front camera (e.g., the front camera 432 in FIG. 4) and an eye tracking camera (e.g., the eye tracking camera 434 in FIG. 4). The processor may measure the area 612 of the object positioned on the field of view 602, and compare the measure region with a predetermined area. When the size of the area 612 of the object is equal to or greater than that of the predetermined area, the processor may reduce the size of the content 620, and output the content on one side of a display (e.g., the display 420 in FIG. 4), and when the size of the area 612 of the object is smaller than that of the predetermined area, the processor may output the content 620 on a region having no overlap with the object. FIG. 6A illustrates a case where the size of the area 612 of the object is smaller than that of the predetermined area.

According to various embodiments, when the area 612 of the object is smaller than that of the predetermined area, the processor may move the content 620 so that there is no region on which the content and the object overlap with each other. For example, referring to FIG. 6B, the processor may move the content 620 so that there is no region on which the content and the object overlap with each other. According to an embodiment, the processor may reduce the size of the content 620 to be entirely displayed on the display while repositioning the content 620. The processor may determine a movement direction of the content 620 according to the position of the object on the field of view 602. For example, as illustrated in FIG. 6B, when the object is positioned at the bottom of a screen, the processor may move the content 620 to the top thereof. For example, when the object is positioned at the right of a screen, the processor may move the content 620 to the left thereof.

Figure 7A:
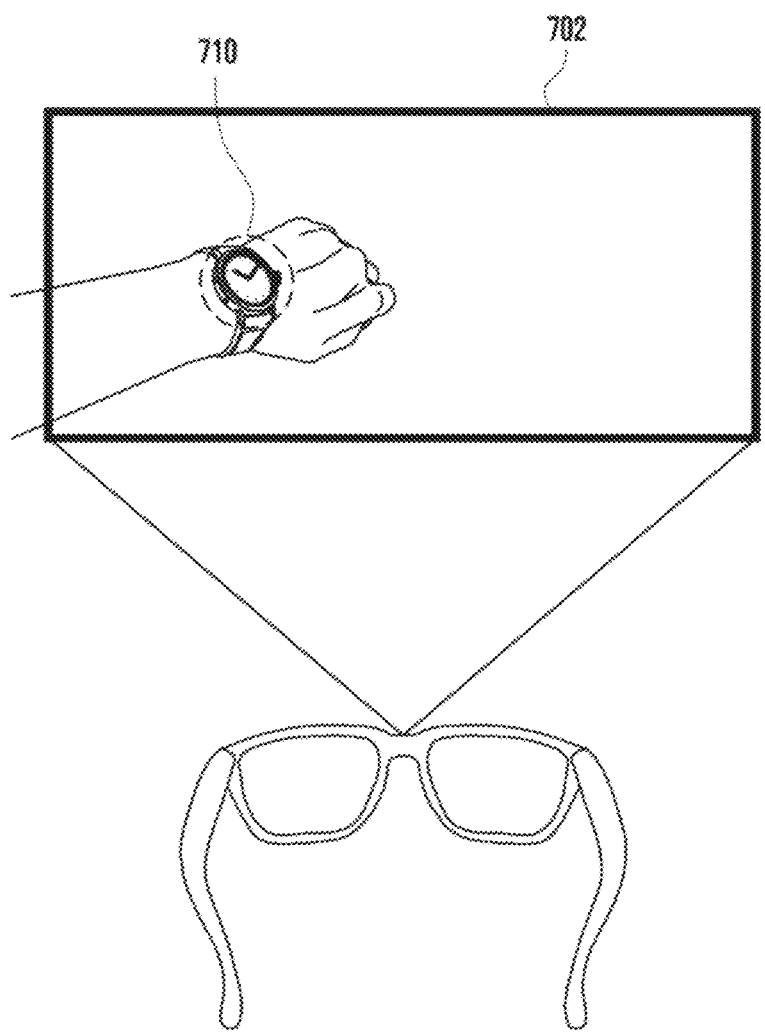
FIG. 7A and FIG. 7B are diagrams illustrating removal of a partial region of content by an electronic device according to various embodiments.
Figure 7B:
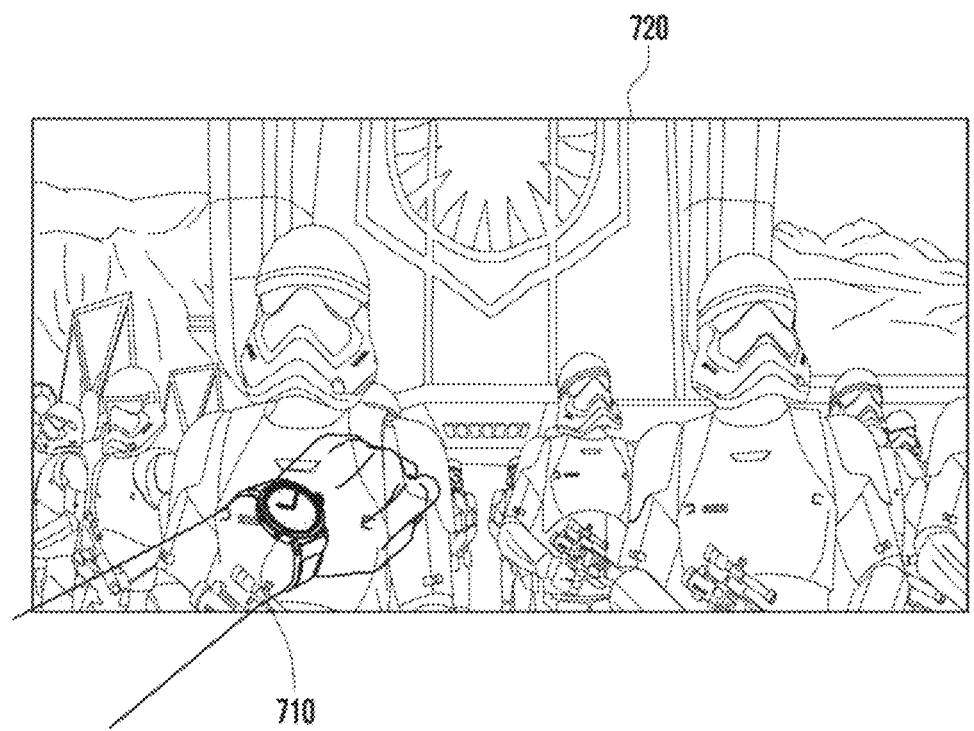

FIG. 7A and FIG. 7B are diagrams illustrating removal of a partial region of content by an electronic device according to various embodiments.

According to various embodiments, when an area occupied by an object 710 on a field of view 702 is smaller than a predetermined area, a processor (e.g., the processor 410 in FIG. 4) may not output the content 720 on a region overlapping with the object 710. Referring to FIG. 7A, the processor may recognize the object 710 positioned on the field of view 702. When the area occupied by the object 710 on the field of view 702 is smaller than the predetermined area, the processor may not change the position and size of the content 720, and may not output the content 720 on an overlapped region.

FIG. 7B is a diagram illustrating an embodiment in which the content 720 is removed on a region on which the content 720 and the object 710 overlap with each other. The processor may recognize, by means of an eye tracking camera (e.g., the eye tracking camera 434 in FIG. 4), that the user stares at the object 710, may measure the area thereof, and when the measured area is smaller than a predetermined region, may remove an overlapped region of the content 720. According to an embodiment, the processor may remove a part of the content 720 or reposition the content 720, based on the position of the object 710 in the field of view 702. When the object 710 is positioned at an edge of the field of view 702, the processor may reposition the content 720, and when the object 710 is positioned on a center portion of the field of view 702, the processor may remove a partial region of the content 720.

Figure 8A:
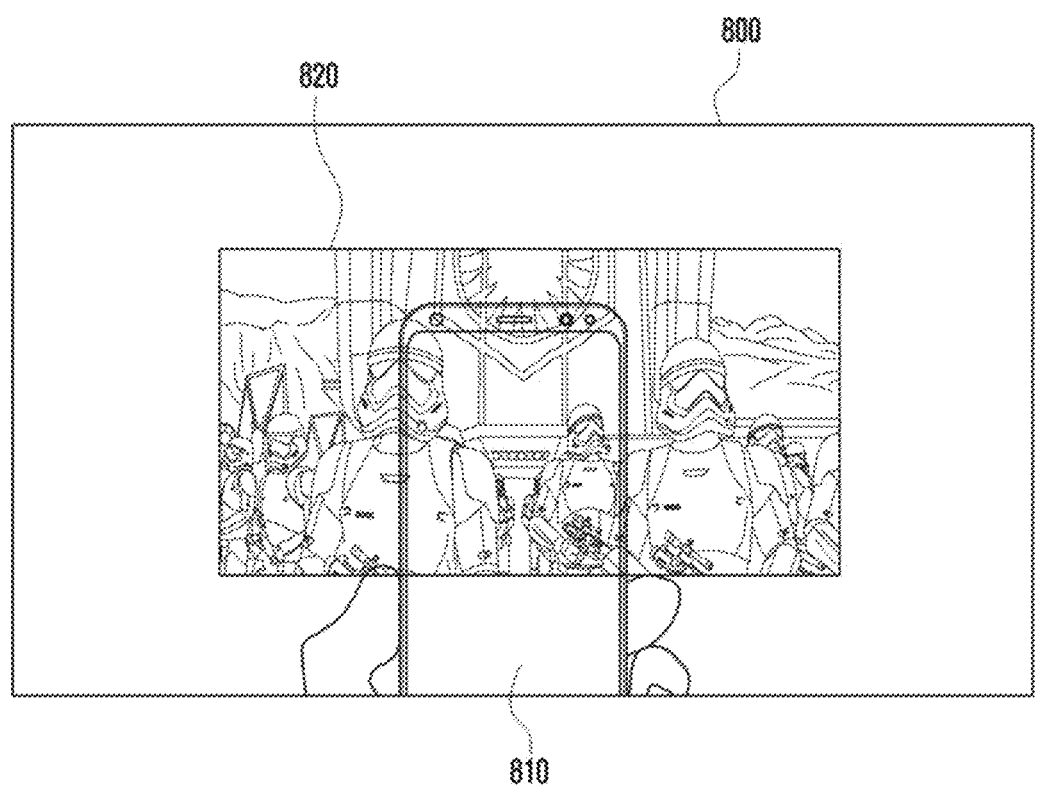
FIG. 8A and FIG. 8B are diagrams illustrating reduction of content size by an electronic device according to various embodiments.
Figure 8B:
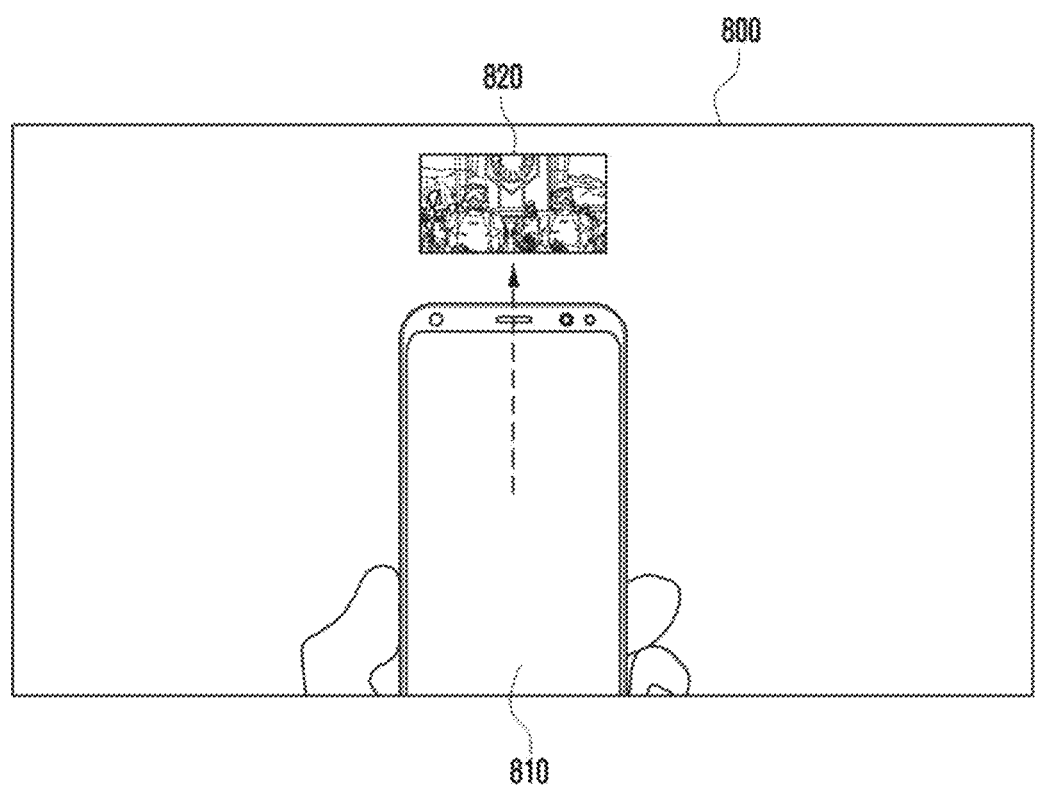

FIG. 8A and FIG. 8B are diagrams illustrating reduction of content size by an electronic device according to various embodiments.

According to various embodiments, a processor (e.g., the processor 410 in FIG. 4) may reduce the size of content 820 and display same on one side of a display (e.g., the display 420 in FIG. 4), based on an area occupied by an object 810 in a field of view 800. Referring to FIG. 8A, the processor may recognize the object 810 positioned at the front in the field of view 800. The processor may measure the area of the object 810, and compare same with a predetermined area. When the area of the object 810 is equal to or greater than the predetermined area, the processor may reduce the size of the output content 820 and output same on one side of the display, as illustrated in FIG. 8B. The processor may determine that the user is focusing more on the object that appeared at the front in a field of view, than on the content 820 that is currently being output. In a case where the size of the object 810 is large, even when the processor removes a partial region of the content 820 or change an output position, it may be difficult to identify the object. Therefore, the processor may adjust the entire size of the content 820.

For example, while outputting the content 820, the processor may recognize the object 810 appearing in the field of view 800 of a camera. When the area of the object 810 is equal to or greater than the predetermined area, the processor may reduce the size of the content 820 that is being output, and output same on one side of the display. When the processor is outputting multiple contents, the processor may change the sizes and positions of the multiple contents. For example, the processor may reduce (e.g., thumbnail size) the sizes of the contents, and change the positions of the contents to positions closest to the contents in an edge region, respectively. The processor may temporarily stop the reproduction of a content having moved to the edge region. The processor may output a content at a fixed position of the display so that the content is moved together according to the user's head movement.

Figure 9A:
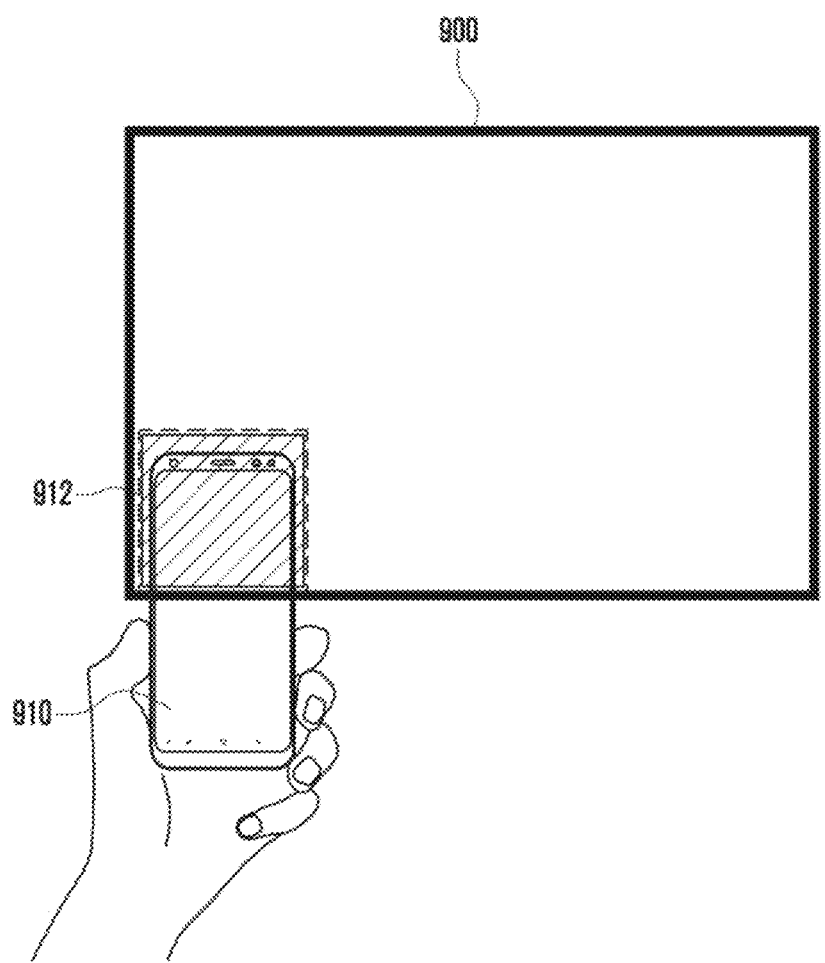
FIGS. 9A, 9B, and 9C are diagrams illustrating an embodiment in which an electronic device according to various embodiments determines a content output type according to an area and position occupied by an object within a user's field of view.
Figure 9B:
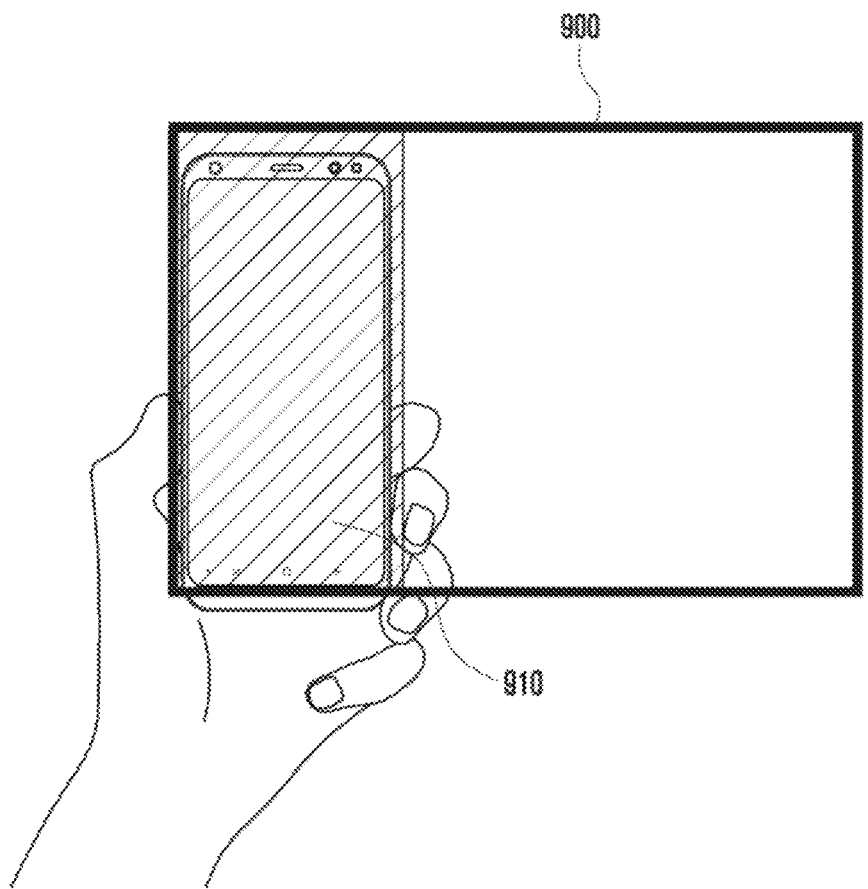
Figure 9C:
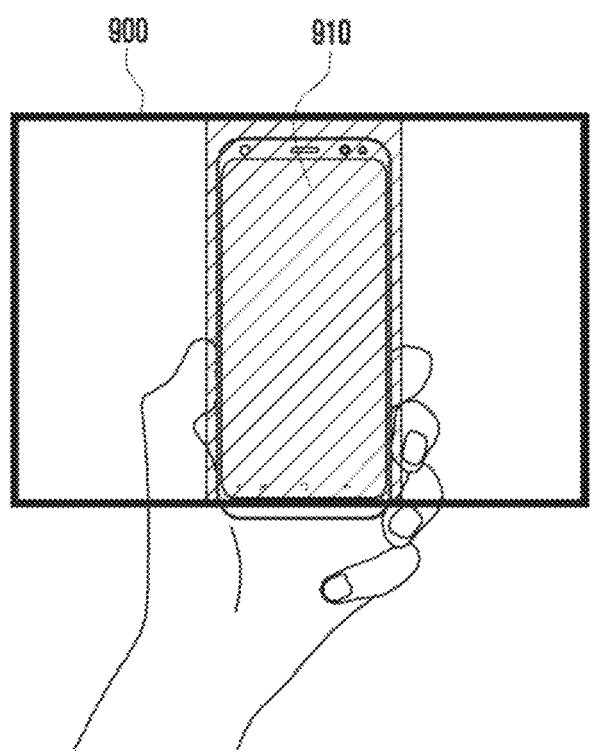

FIGS. 9A, 9B, and 9C are diagrams illustrating an embodiment in which an electronic device according to various embodiments determines a content output type according to an area and position occupied by an object within a user's field of view.

According to various embodiments, a processor (e.g., the processor 410 in FIG. 4) may determine an output type of content according to the position of an object 910 on a field of view 900. The processor may determine whether the object 910 is positioned in an edge region or a center region of the field of view 900. The processor may determine the edge region or the center region, based on a position spaced apart from the center of the entire field of view 900. For example, the processor may configure, as the center region, a region spaced a first length apart from the center of the field of view 900, and may configure, as the edge region, a remaining region. The processor may determine an output type of content, based on whether the object 910 is positioned in the center region of the field of view 900 or in the edge region. For example, when the object 910 is positioned in the edge region of the field of view 900, and an area 912 occupied by the object 910 is smaller than a predetermined area, the processor may remove a partial region of content or reposition the content. Referring to diagram FIG. 9A, because the object 910 is positioned in the edge region of the field of view 900, and the region occupied by the object 910 is smaller than the predetermined area, the processor may remove a partial region of content or reposition the content. When the object 910 is positioned in the edge region of the field of view 900, and the area 912 occupied by the object 910 is equal to or greater than the predetermined area, the processor may reposition the content. Referring to diagram FIG. 9B, because the object 910 is positioned in the edge region of the field of view 900, and the region occupied by the object 910 is equal to or greater than the predetermined area, the processor may reposition and output the content. When the object 910 is positioned in the center region of the field of view 900, and the area occupied by the object 910 is equal to or greater than the predetermined area, the processor may reduce the size of the content and display same on one side of a display (e.g., the display 420 in FIG. 4). Referring to FIG. 9C, because the object 910 is positioned in the center region of the field of view 900, and the area occupied by the object 910 in the field of view 900 is equal to or greater than the predetermined area, the processor may reduce the size of the content and display same on one side of the display so as to enable the user to further smoothly recognize the object 910. According to an embodiment, when the processor recognizes the object 910 while reproducing multiple contents, the processor may reduce the sizes of the multiple contents and reposition same to the edge region of the field of view 900. For example, the processor may recognize the object 910 while reproducing first content, second content, and third content. The processor may reposition the first content, the second content, and the third content to the edge region of the field of view 900. The processor may identify positions closest to the contents in the edge region of the field of view 900, and reposition the contents to the identified positions, respectively. For example, the processor may reposition the first content to a first position closest to the first content within the edge region, reposition the second content to a second position closest to the second content within edge region, and reposition the third content to a third position closest to the third content within the edge region. According to an embodiment, the processor 900 may temporarily stop the reproduction of content while repositioning the content to the edge region of the field of view 900. When the object 910 is positioned in the center region of the field of view 900, and the area occupied by the object 910 is smaller than the predetermined area, the processor may remove content on a region overlapping with the object 910.

Figure 10A:
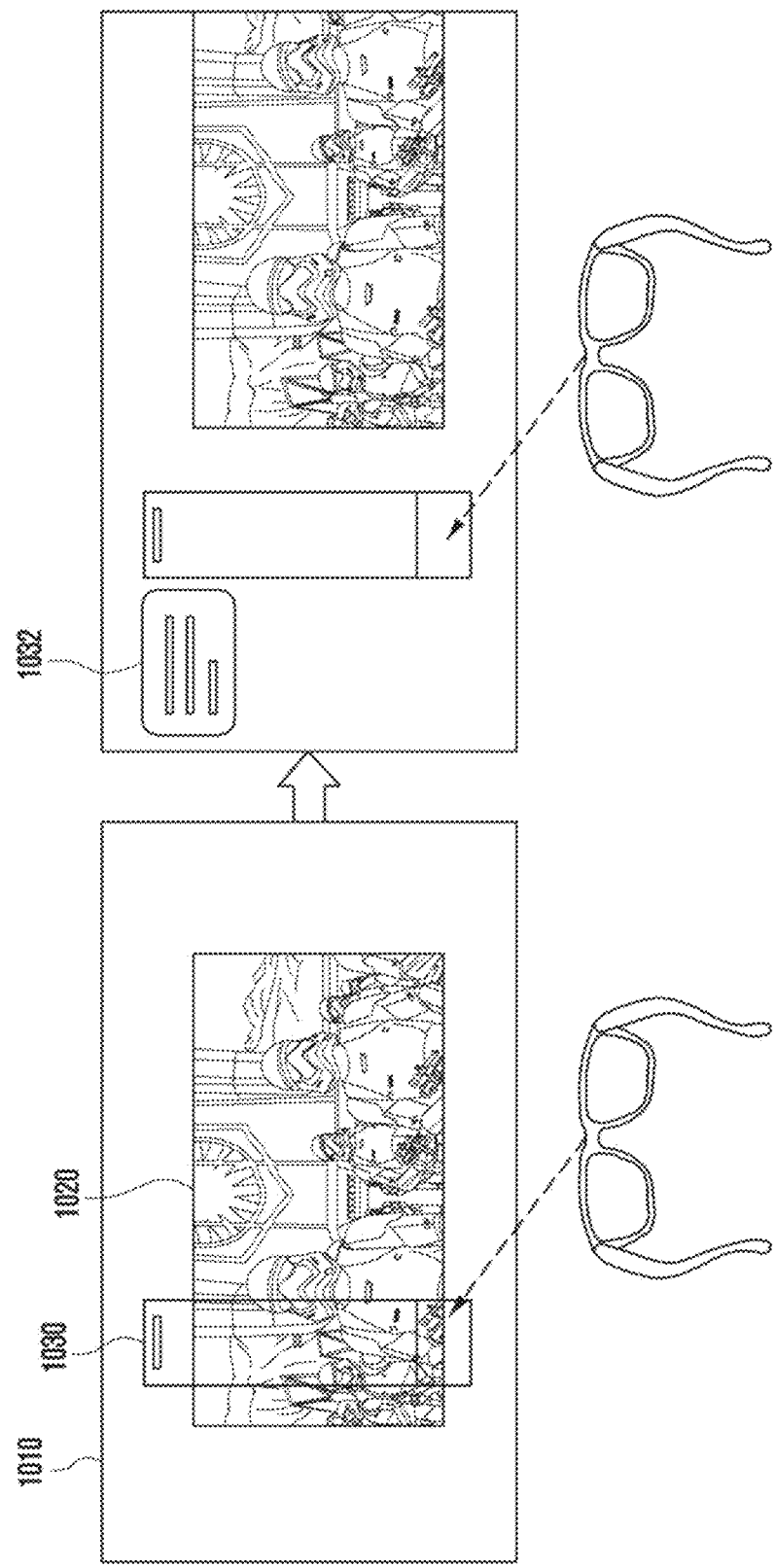
FIG. 10A and FIG. 10B are diagrams illustrating an embodiment in which an electronic device according to various embodiments outputs additional information of an object on a display.
Figure 10B:
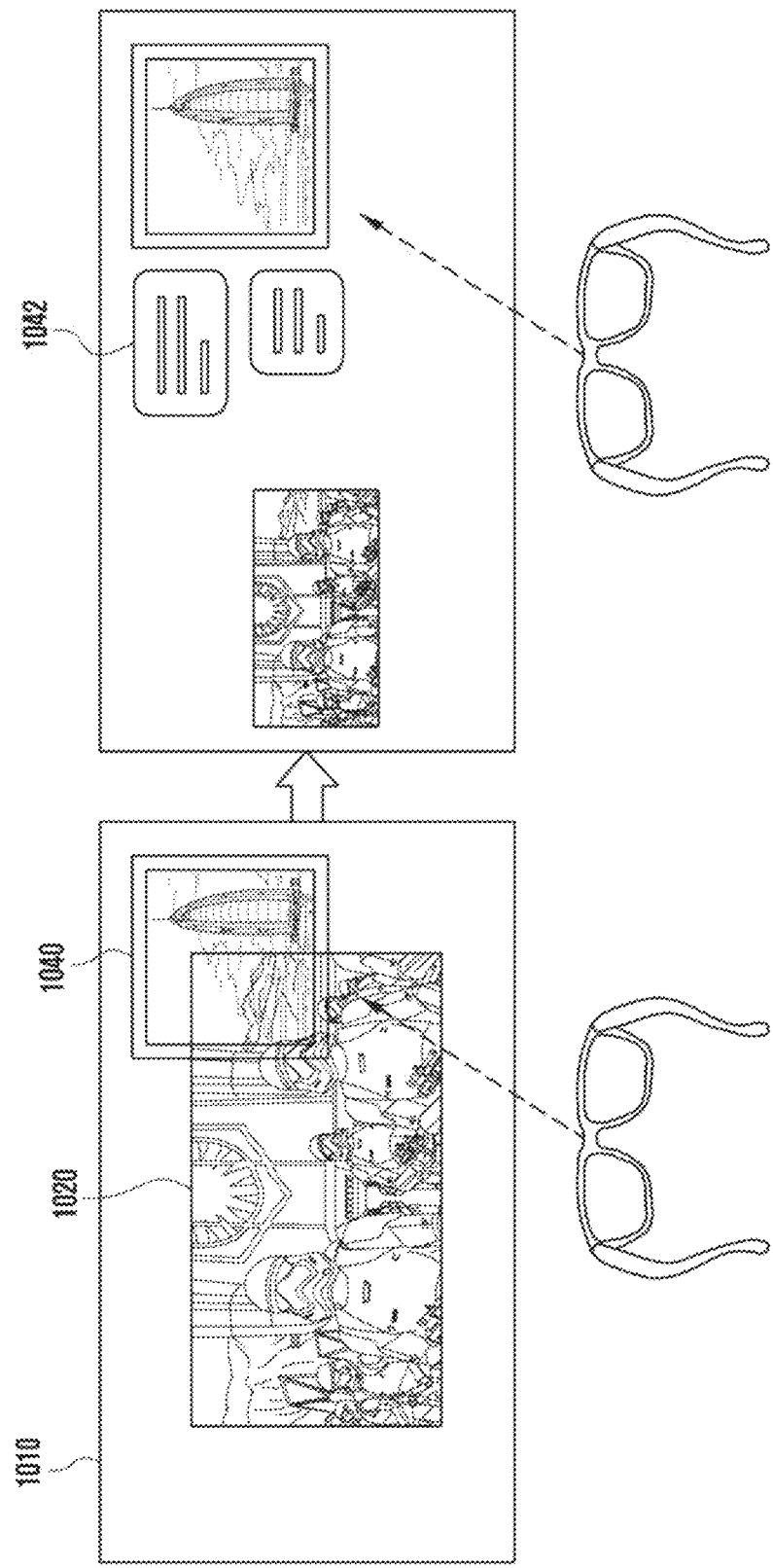

FIG. 10A and FIG. 10B are diagrams illustrating an embodiment in which an electronic device according to various embodiments outputs additional information of an object on a display.

According to various embodiments, a processor (e.g., the processor 410 in FIG. 4) may obtain additional information of a recognized object 1030, and output the information on a display (e.g., the display 420 in FIG. 4). For example, when the processor recognizes an external device by means of a front camera (e.g., the front camera 432 in FIG. 4), the processor may obtain additional information such as a function provided by the external device, and a performance of the external device, and output the information at one side of the external device. According to an embodiment, the processor may establish a communication link with the external device by means of a communication module (e.g., the communication module 440 in FIG. 4), and receive data relating to the additional information from the external device. The processor may output a graphic UI 1032 including the additional information of the external device, based on the received data.

According to various embodiments, the processor may change the size and position of content 1020 in order to output the graphic UI 1032 including the additional information of the object 1030. The processor may change the size and the position of the content 1020 so that there is no region on which the object 1030 and the content 1020 overlap with each other. Referring to FIG. 10A, when the recognized object 1030 is positioned at the left of a field of view 1010, the processor may reduce the size of the content 1020 and move same to the right. The processor may further output the graphic UI 1032 including the obtained additional information at one side of the object 1030. The graphic UI 1032 output by the processor may be a message type or an image or a video, but is not limited thereto. According to an embodiment, the processor may display the graphic UI 1032 including additional information of the object 1030 that is pre-registered. The processor may store additional information of the object 1030 in a memory (e.g., the memory 450 in FIG. 4) when the object 1030 is registered, and when the pre-registered object 1030 is recognized, the processor may output the graphic UI 1032 including additional information stored in the memory. According to an embodiment, the processor may display the graphic UIs 1032 including additional information of the multiple objects 1030, respectively. For example, when the user is determined to recognize a first object and a second object, based on gaze dwell times, the processor may output first additional information of the first object and second additional information of the second object.

Referring to FIG. 10B, the processor may output a graphic UI 1042 including additional information of an object 1040 that is not registered. According to various embodiments, the processor may recognize the object 1040 which the user stares at, based on a gaze dwell time. When the object 1040 is not a pre-registered object, the processor may connect to a network by communication and search for additional information of the object 1040. The processor may output, on the display, the graphic UI 1042 including the additional information of the object 1040 obtained from the network, and may change the size and position of the content 1020 so that the content does not overlap the object 1040 and the graphic UI 1042 including the additional information.

Figure 11:
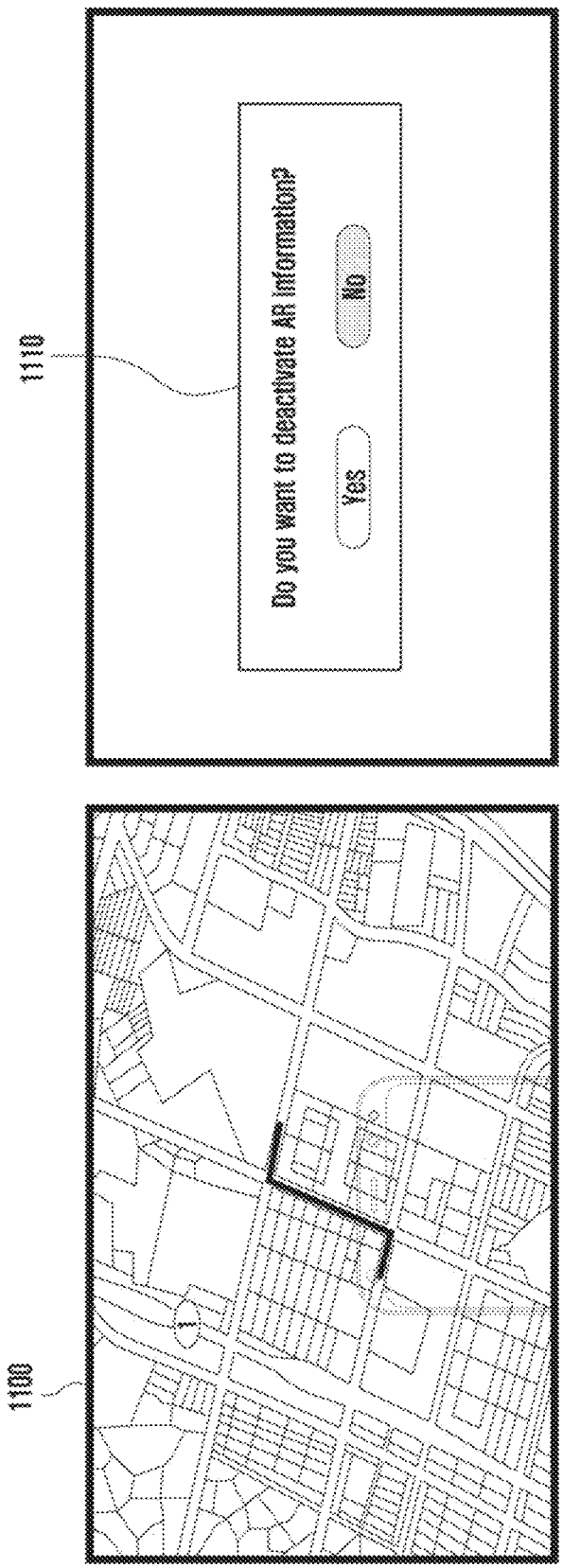
FIG. 11 is a diagram illustrating an embodiment in which an electronic device according to various embodiments determines an output type according to the importance level of content.

FIG. 11 is a diagram illustrating an embodiment in which an electronic device according to various embodiments determines an output type according to the importance level of content.

According to various embodiments, a processor (e.g., the processor 410 in FIG. 4) may determine an importance level of content 1100 that is being output. The importance level of each content may be differently configured for applications, or may be determined based on a user input. Referring to FIG. 11, since a navigation application continuously generates information and provide same to a user, the processor may configure a high importance level therefor. In a case where the navigation application is being executed, even when an area occupied by an object in a front field of view is equal to or greater than a predetermined area, the processor may not reduce the size of the content 1100. On the contrary, an object is recognized in a field of view during output of the content 1100 (e.g., watching a movie or video) having a low importance level, the processor may determine an output type based on an area occupied by the content 1100.

According to various embodiments, the processor may change the size and position of the content 1100, based on a user input. According to an embodiment, the processor may output a graphic UI 1110 including a message before changing the size and position of the content 1100. For example, when the processor recognizes an object occupying an area equal to or greater than a predetermined area while outputting the content 1100 having a high importance level, the processor may output the graphic UI 1110 including a message such as "Do you want to deactivate AR information?". The processor may, based on a user input to the message, reduce the size of the content 1100 that is being output, and display same on one side of a display (e.g., the display 420 in FIG. 4).

Figure 12:
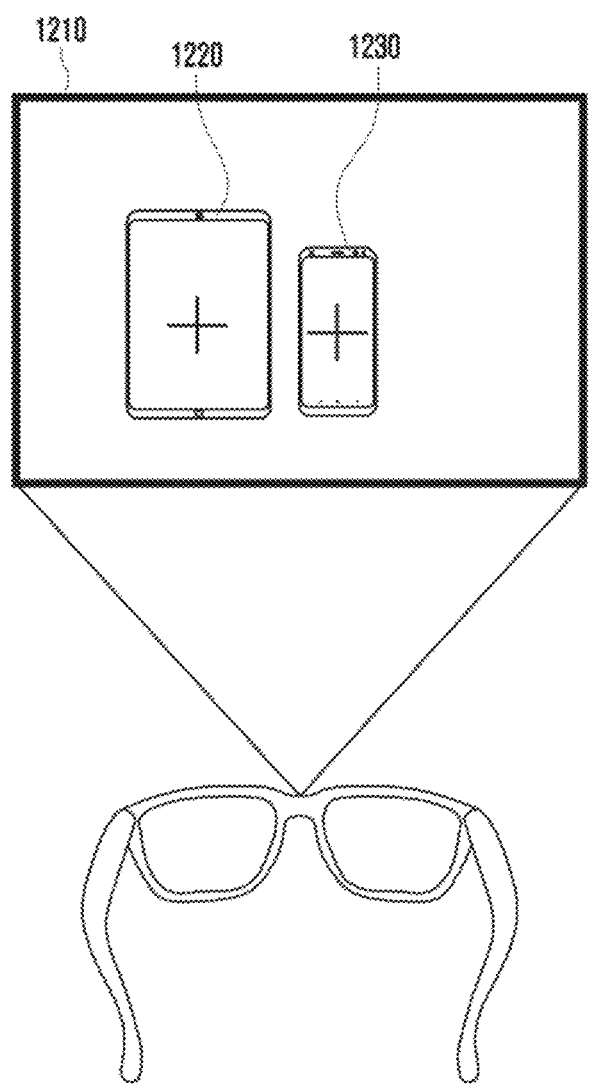
FIG. 12 is a diagram illustrating an embodiment of a case where multiple objects are located in front of an electronic device according to various embodiments.

FIG. 12 is a diagram illustrating an embodiment of a case where multiple objects are located in front of an electronic device according to various embodiments.

According to various embodiments, a processor (e.g., the processor 410 in FIG. 4) may recognize multiple objects positioned in a front field of view 1210. According to an embodiment, the processor may obtain the user's gaze dwell times for the multiple objects, respectively. For example, the processor may obtain a first gaze dwell time for a first object 1220 and a second gaze dwell time for a second object 1230 in the field of view 1210. The processor may compare the gaze dwell times for the objects with a reference time, and determine an object of interest that the user stares at. For example, when the first gaze dwell time for the first object 1220 is equal to or greater than a reference time, but the second gaze dwell time for the second object 1230 is smaller than the reference time, the processor may determine only the first object 1220 as an object of interest. When the first gaze dwell time and the second gaze dwell time are both equal to or greater than the reference time, the processor may determine both the first object 1220 and the second object 1230, as the objects of interest which the user are interested in.

According to various embodiments, the processor may determine an output type of content, based on the size of an area occupied by an object of interest within the field of view 1210. When there are multiple objects of interest, the processor may sum up the areas of the objects, and the size of the area of the objects of interest. For example, when objects of interest includes the first object 1220 and the second object 1230, the processor may compare a predetermined area with an area obtained by summing up a first area of the first object 1220 and a second area of the second object 1230, and determine an output type.

Figure 13A:
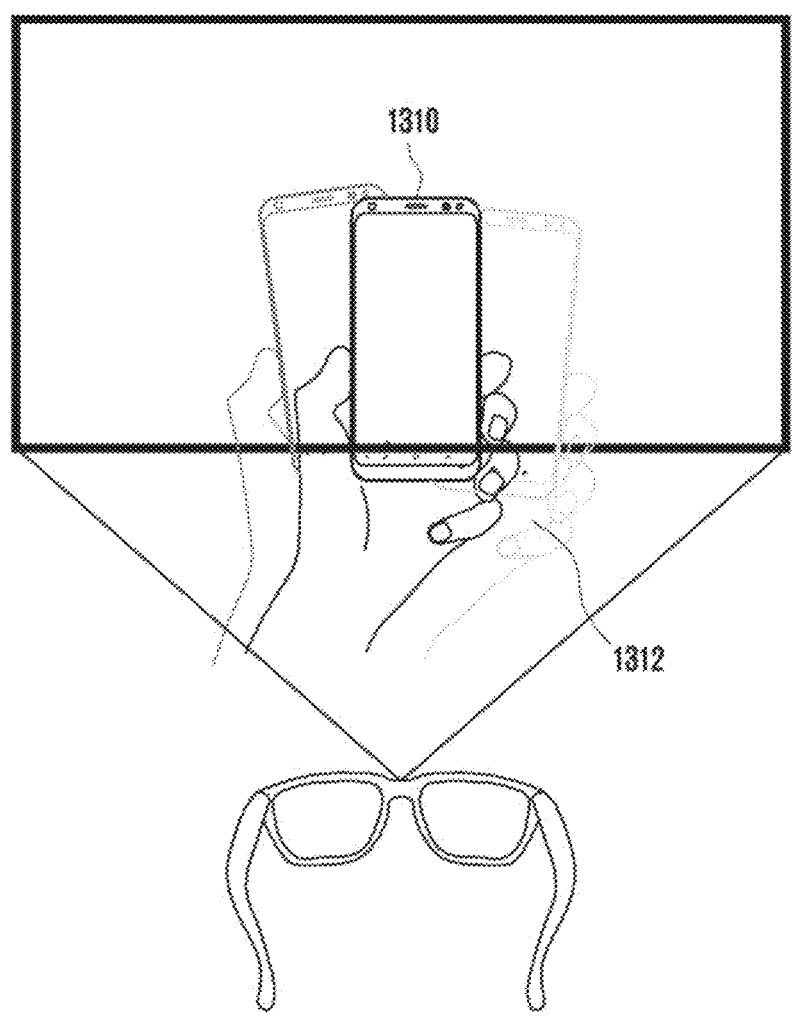
FIG. 13A and FIG. 13B are diagrams illustrating an embodiment in which an electronic device according to various embodiments recognizes a gesture and determines an output type.
Figure 13B:
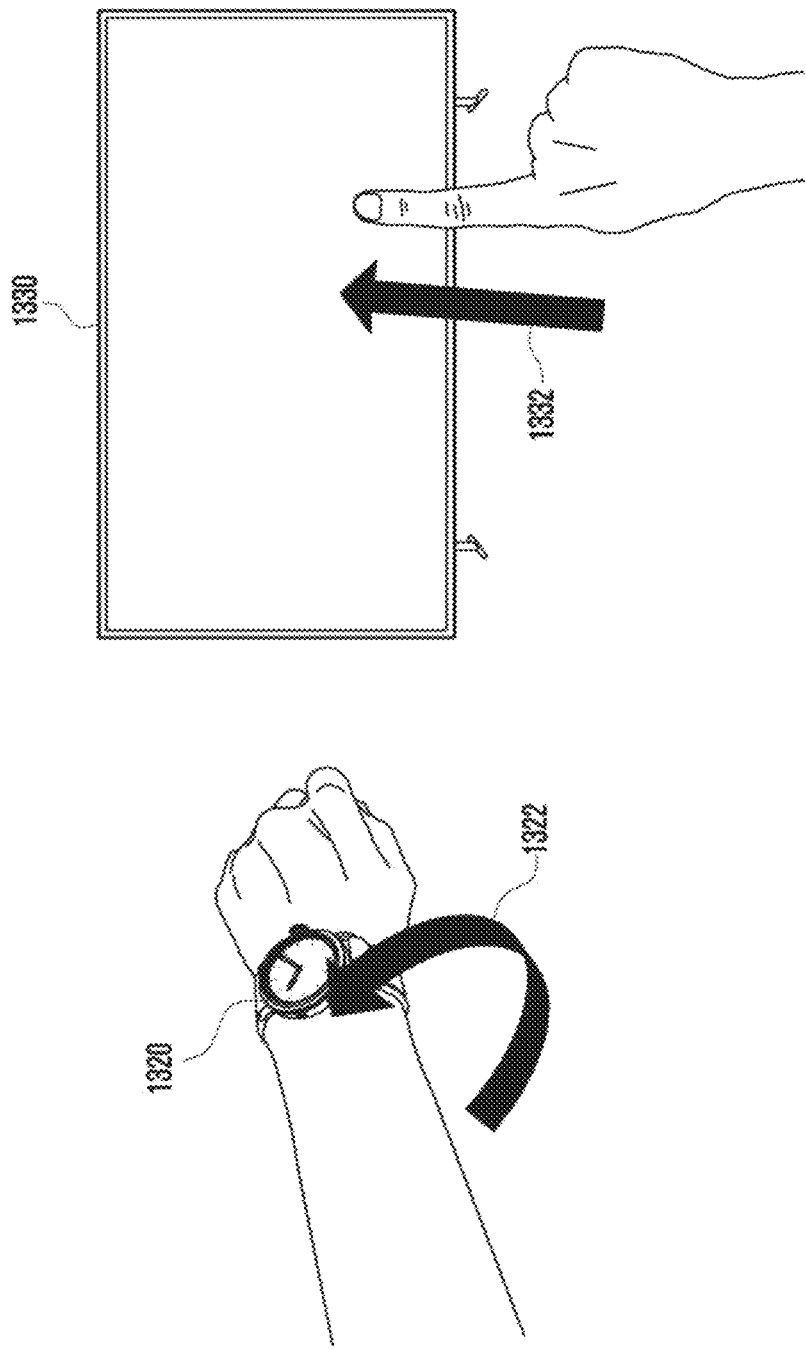

FIG. 13A and FIG. 13B are diagrams illustrating an embodiment in which an electronic device according to various embodiments recognizes a gesture and determines an output type.

According to various embodiments, a processor (e.g., the processor 410 in FIG. 4) may determine, based on a received gestures 1312, that a user recognizes an object 1310. The processor may determine the gesture 1312 enabling recognition of the object 1310 positioned within a field of view of a front camera (e.g., the front camera 432 in FIG. 4). When the gesture 1312 is identified via the front camera, the processor may determine that the user is recognizing the object 1310, without obtaining a gaze dwell time. Referring to FIG. 13A, the processor may store the gesture 1312 of shaking the object 1310 to the left and right in a memory (e.g., the memory 450 in FIG. 4), and when the gesture 1312 is recognized, the processor may determine that the user recognizes the object 1310. Thereafter, when the gesture 1312 of shaking the object 1310 to the left and right in a field of view is recognized, the processor may determine that the user recognizes the object 1310, without obtaining a gaze dwell time for the object 1310.

Referring to FIG. 13B, the processor may generate unique gestures for objects, respectively, map the unique gestures to the objects, and store same in the memory. The processor may recognize a particular gesture, and determine that the user recognizes an object mapped to the gesture. For example, the processor may map a gesture 1322 of flipping the wrist to a wearable device 1320 (e.g., a smart watch). When the processor recognizes the gesture 1322 of flipping the wrist, the processor may determine that the user recognizes the wearable device 1320. For example, the processor may map a gesture 1332 of stretching a finger to an external device 1330 (e.g., television (TV)). When the processor recognizes the gesture 1332 of stretching a finger, the processor may determine that the user recognizes the external device 1330.

FIG. 14 is a diagram illustrating an embodiment of determining an output type according to the number of hands with which a user holds an object according to various embodiments.

According to various embodiments, a processor (e.g., the processor 410 in FIG. 4) may determine an output type of content according to the number of hands a user holds an object. The processor may determine an output type of content, based on whether the user holds (motion 1400) an object with one hand or holds (motion 1420) the object with two hands. Referring to FIG. 14, when the user holds (motion 1400) an object with one hand, the processor may determine an output type of content, based on an area occupied by the object in a field of view. When the user holds (motion 1402) an object with two hands, the processor may determine that the user has recognized the object held by the user, reduce the size of content, and output same on one side of a display (e.g., the display 420 in FIG. 4).

Figure 15:
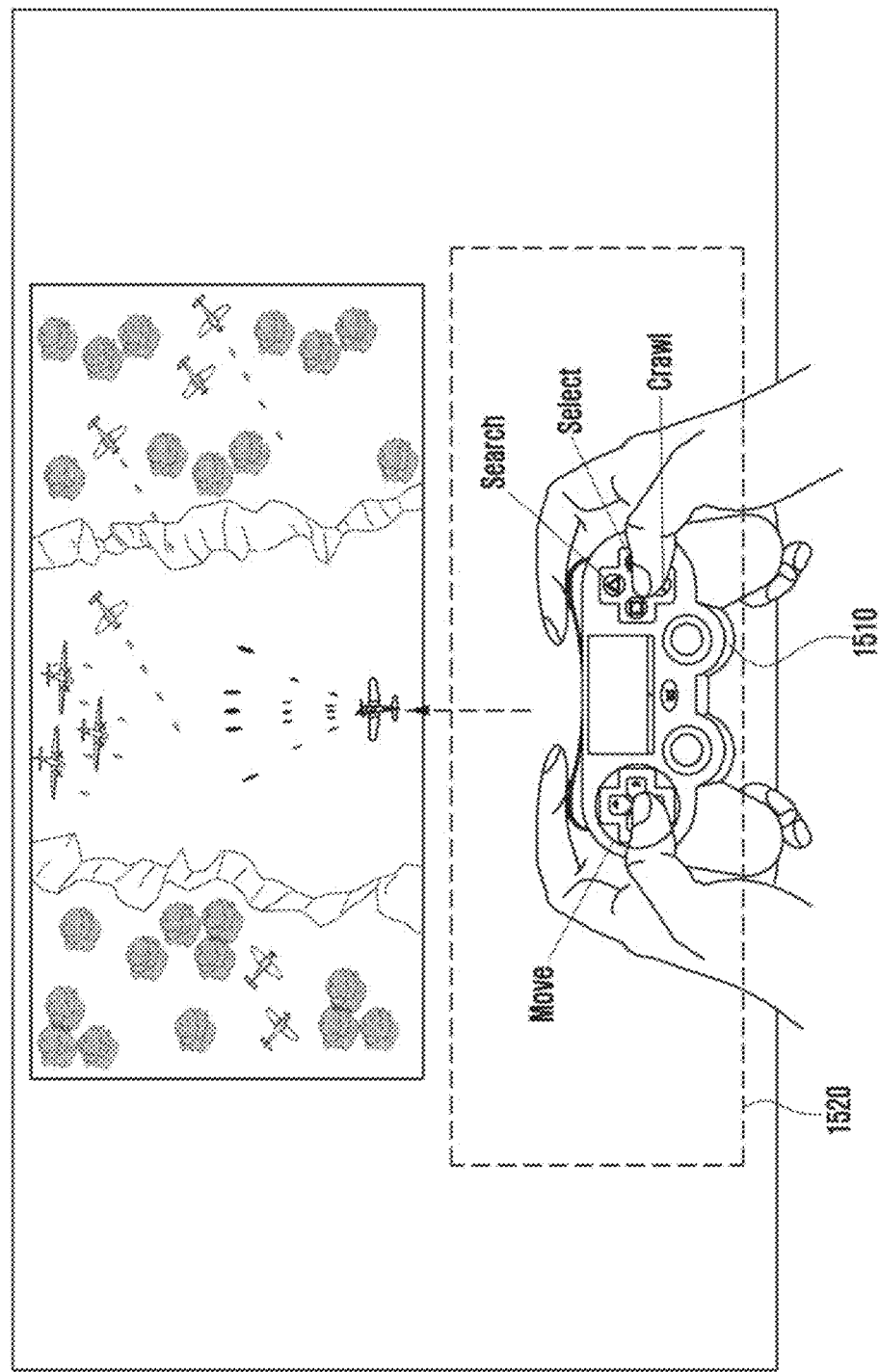
FIG. 15 is a diagram illustrating an embodiment of outputting additional information on an object connected to an electronic device according to various embodiments through communication.

FIG. 15 is a diagram illustrating an embodiment of outputting additional information on an object connected to an electronic device according to various embodiments through communication.

According to various embodiments, a processor (e.g., the processor 410 in FIG. 4) may output additional information of an object 1510 connected thereto by communication on a display (e.g., the display 420 in FIG. 4). The processor may obtain additional information of the object 1510, and output a graphic UI 1520 providing the additional information of the object 1510. According to an embodiment, the processor may obtain the additional information of the object 1510 by using a communication link. For example, the processor may establish a communication link with a controller including at least one button, and output the graphic UI 1520 including additional information of each button. The processor may receive data including a function of each button from the controller through the communication link, and may output the graphic UI 1520 including a description for each button, based on the received data.

An electronic device according to various embodiments may include a body part, a glass member supported by the body part, a display disposed at the glass member, a support part rotatably connected to the body part, a sensor module including an eye tracking camera and a front camera configured to capture an image of a front side of a user, and a processor operatively connected to the display and the sensor module, wherein the processor is configured to output at least one content via the display, recognize at least one object by controlling the front camera, obtain the user's gaze dwell time for the object from the eye tracking camera, when the gaze dwell time is greater than or equal to a reference time, calculate an area occupied by the object in a field of view (FOV) of the front camera, based on the area, output the at least one content on a region having no overlap with the object, or reduce a size of the at least one content and output the at least one content on one side of the display, and when the user's gaze dwell time for the object is smaller than the reference time, output the at least one content in a type identical to an initial output type.

According to various embodiments, the processor may obtain position coordinates of the object in the field of view from the front camera, determine, based on the position coordinates, a region on which the object is positioned in an edge region or a center region of the field of view, and output the at least one content, based on the area and the region on which the object is positioned in the field of view.

According to various embodiments, when the object is positioned in the edge region of the field of view, or the area is smaller than a predetermined area, the processor may output the at least one content on a region having no overlap with the object, and when the object is positioned in the center region of the field of view, and the area is equal to or greater than the predetermined area, the processor may reduce the size of the at least one content and output the at least one content on one side of the display.

According to various embodiments, in a case where the at least one content is output on the region having no overlap with the object, when the area occupied by the object is smaller than the predetermined area, the processor may output the at least one content on a region remaining after excluding a region displaying the object, and when the area occupied by the object is equal to or greater than the predetermined area, and the region displaying the object belongs to the edge region, the processor may move a region outputting the at least one content so that the moved region does not overlap with the region displaying the object.

According to various embodiments, the processor may determine whether the object is a pre-registered object, based on an image of the object obtained using the front camera, and when the object is a pre-registered object, obtain the user's gaze dwell time for the object.

According to various embodiments, when the object is a pre-registered object, the processor may further output a graphic UI including additional information of the object on the display.

According to various embodiments, when the size of the at least one content is reduced and then the at least one content is output on one side of the display, the processor may temporarily stop reproduction of the content at a time point of reducing the size of the content.

According to various embodiments, the processor may search for an image of the object and obtain related information, and output a graphic UI including the related information at one side of the object in the field of view.

According to various embodiments, the processor may obtain an image of a hand with which the object is held from the front camera, when the gaze dwell time is equal to or greater than the reference time, and the object is held with one hand, output the at least one content on a region having no overlap with the object, based on the area, and when the gaze dwell time is equal to or greater than the reference time, and the object is held with both hands, reduce the size of the at least one content and output the at least one content on one side of the display.

According to various embodiments, when the front camera recognizes a first object and a second object, the processor may determine, as an object of interest, at least one of the first object and the second object, based on a first gaze dwell time for the first object and a second gaze dwell time for the second object, and output the at least one content, based on an area occupied by the at least one object of interest in the field of view.

According to various embodiments, the processor may determine that the user has recognized the object, by recognizing a gesture of a hand holding the object by means of the front camera.

According to various embodiments, the processor may generate a unique gesture of an object, map the unique gesture to the object, and store the mapped unique gesture and object, and when the unique gesture is recognized, determine that the user has recognized the object mapped to the unique gesture.

According to various embodiments, the processor may determine an importance level of the at least one content, and when the importance level is equal to or greater than a predetermined value, the size of the at least one content is reduced, and the at least one content is outplaced on one side of the display, simultaneously output the at least one content and the object, based on a user input.

Figure 16:
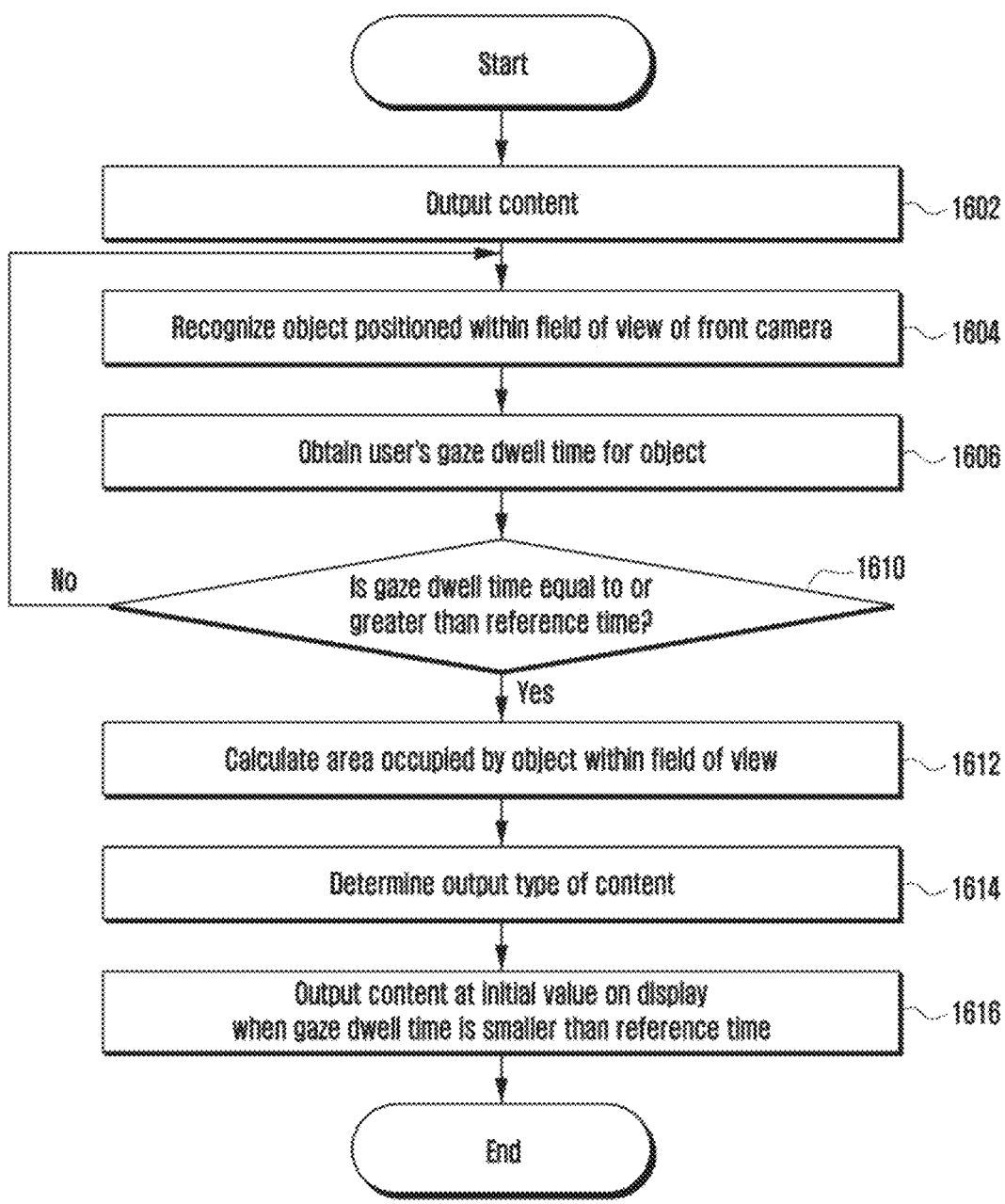
FIG. 16 is a flowchart of a method of outputting content by an electronic device according to various embodiments.

FIG. 16 is a flowchart of a method of outputting content by an electronic device according to various embodiments.

The method illustrated in FIG. 16 may be performed by an electronic device (e.g., the electronic device 101 in FIG. 1) described with reference to FIG. 1 to FIG. 15, and in the following description, a description of technical features described above will be omitted.

According to various embodiments, in operation 1602, the electronic device may output content on a display (e.g., the display 420 in FIG. 4). Content which can be output on the display by the electronic device may correspond to an image, a movie, an animation, a game, a video, and an execution screen of various applications provided by the electronic device. The electronic device may output content on a user's field of view in the display, and may output content on at least partial region in the user's field of view. When content output by the electronic device is an image having a particular size and is reproducible and stoppable, the electronic device may reproduce or stop the content output thereby according to a predetermined condition.

According to various embodiments, in operation 1604, the electronic device may recognize an object positioned within a field of view of a front camera. The electronic device can recognize one or multiple objects. According to an embodiment, the electronic device may recognize and register at least one object. The electronic device may store information on the registered object in a memory (e.g., the memory 450 in FIG. 4). According to an embodiment, the electronic device may recognize an object within the user's field of view only when the object is pre-registered.

According to various embodiments, in operation 1606, the electronic device may obtain the user's gaze dwell time for the object. The electronic device may obtain information on the user's gaze from an eye tracking camera (e.g., the eye tracking camera 434 in FIG. 4). The gaze information may include a gaze dwell time which is a time the user stares at one or more objects. The electronic device can recognize multiple objects, and thus may obtain multiple gaze dwell times from the eye tracking camera. According to an embodiment, the electronic device may obtain a gaze dwell time only when a recognized object is pre-registered.

According to various embodiments, in operation 1610, the electronic device may determine whether the obtained gaze dwell time is equal to or greater than a reference time. The electronic device may determine a reference time for gaze dwell time. The reference time may be long enough for the user not to recognize an object the user is not focusing on, and may be short enough for the user to quickly recognize an object the user is focusing on. When the user's gaze dwell time for an object is equal to or greater than the reference time, the electronic device may determine that the user has recognized the object.

According to various embodiments, in operation 1612, when the gaze dwell time is equal to or greater than the reference time, the electronic device may calculate an area occupied by the object within the front field of view. The electronic device may obtain an image of a situation in front of the electronic device from the front camera. The electronic device may identify an image of the object included in the image, and calculate (obtain) the area of the object, based on a ratio of the number of pixels assigned to the image of the object to the entire resolution.

According to various embodiments, in operation 1614, the electronic device may determine an output type of the content. According to various embodiments, the electronic device may output the content, based on the measured area. When an area occupied by an object within the field of view of the front camera is smaller than a predetermined area, the electronic device may output content on a region having no overlap with the object. When an area occupied by an object is smaller than the predetermined area, the electronic device may determine that the user can recognize the object even when only a partial region of content that is being currently output is removed. When the electronic device has removed only a partial region of content, the user may recognize an object that appeared within the field of view thereof, while continuously watching content that the user has been watching (or using). According to an embodiment, the electronic device may remove content on a region on which an object is positioned in a field of view. According to another embodiment, the electronic device may reposition content so that there is no region on which an object and the content overlap with each other. According to an embodiment, the electronic device may adjust the size of content while repositioning the content.

According to various embodiments, when an area of an object is equal to or greater than a predetermined area, the electronic device may reduce the size of content and output the content on one side of the display. When an area occupied by an object within a field of view is equal to or greater than the predetermined area, it may be difficult for the user to simultaneously recognize the object and content that the user has been watching (or using). In this case, the electronic device may reduce and output the content on one side of the display, thereby providing a display environment in which the user is able to recognize the object. According to an embodiment, the electronic device may configure the predetermined area to be small enough for the user to watch content without being interrupted. According to an embodiment, the electronic device may temporarily stop the reproduction of content while reducing the size of the content.

According to various embodiments, the electronic device may control an output type of content in real time. According to an area occupied by an object within a field of view, the electronic device may change the size of content in real time, reposition the content, or not output the content in a partial region.

According to various embodiments, the electronic device may output content, based on the position of an object within a field of view. According to various embodiments, the electronic device may configure a field of view of the front camera to include a center region and an edge region. The electronic device may output content according to whether an object is positioned in the center region or the edge region on the field of view.

According to various embodiments, the electronic device may determine an importance level of content, and output the content, based on the determined importance level. The electronic device may determine the importance level, based on a function executed in the content. According to an embodiment, when an object is sensed while content having a high importance level is being reproduced, the electronic device may not reduce the size of the reproduced content or may simultaneously display the object and the content. According to an embodiment, when content having a low importance level is being reproduced, the electronic device may determine an output type of the content, based on the size of an area occupied by an object.

According to various embodiments, the electronic device may sense a gesture and a movement to recognize an object. The electronic device may recognize a predetermined gesture by means of the front camera. When a predetermined gesture is recognized, the electronic device may determine that the user is recognizing an object, without obtaining a gaze dwell time for the object.

According to various embodiments, the electronic device may map a unique gesture to each object and store same. The electronic device may configure different unique gestures for types of objects, respectively, without configuring only one gesture, and when a particular gesture is recognized, may recognize an object mapped to the gesture.

According to various embodiments, the electronic device may output content according to the number of hands with which the user holds an object. The electronic device may recognize an object and hands with which the user holds the object by means of the front camera. According to an embodiment, when the user holds an object with two hands, the electronic device may determine that the user is focusing on the object, reduce the size of content, and output the content on one side of the display. According to an embodiment, when the user holds an object with one hand, the electronic device may determine an output type of content, based on factors, such as an area and position occupied by the object within a field of view of the front camera.

According to various embodiments, the electronic device may establish a communication link with an object by means of a communication module (e.g., the communication module 440 in FIG. 4). According to an embodiment, the electronic device may establish a communication link with at least one object and store same in the memory. According to an embodiment, an object located in front of the electronic device may be an external device capable of communicating with the electronic device. The electronic device may establish a communication link with the external device, and identify whether the external device is a pre-registered object.

According to various embodiments, the electronic device may output a message UI including information related to an object connected thereto by communication. The electronic device may obtain the information related to the object connected thereto by communication from the memory. The electronic device may output a message UI including information on an object at one side of a region on a field of view, which displays the object. According to various embodiments, when an object is not a pre-registered object, the electronic device may search for the object to obtain information on the object, and display a message UI including the information.

According to various embodiments, the electronic device may recognize multiple objects located within a field of view. For example, the electronic device may recognize multiple objects including a first object and a second object. The electronic device may obtain a first gaze dwell time for the first object and a second gaze dwell time for the second object. The electronic device may determine an object of interest including at least one, which the user is interested in, of the first object and the second object, based on the first gaze dwell time and the second gaze dwell time. According to various embodiments, the electronic device may determine an output type of content, based on the size of an area occupied by an object of interest within a field of view.

According to various embodiments, the electronic device may configure an object of interest. The electronic device may configure at least one object as an object of interest, based on a user input, and recognize the object configured as the object of interest via the front camera. According to an embodiment, an object of interest may be unable to be connected to the electronic device by communication, and the electronic device may recognize the object of interest by identifying a visual characteristic thereof.

According to various embodiments, when an object of interest and content overlap with each other, the electronic device may change the transparency level of the content. The electronic device may change the transparency level of the content, thereby providing, to the user, a notification indicating that the object of interest is located at the front. According to an embodiment, the electronic device may provide information on an object of interest.

According to various embodiments, the electronic device may display an object of interest or content on the display, based on a predetermined switch event. The switch event may include the user's touch on the electronic device, the user's click thereon, and the user's touch input on an external device connected to the electronic device by communication. The electronic device may receive a switch event, output content on the display or minimize and display the content on one side of the display, and output information on an object of interest. According to an embodiment, when information on an object of interest is not output and content is output, the electronic device may change the brightness of the information on the object of interest to be dark, and not output the information after passage of a predetermined time.

According to various embodiments, in operation 1616, the electronic device may output the content at an initial value on the display when the gaze dwell time is smaller than the reference time. The electronic device may obtain a gaze dwell time for an object, and when the time for which the user stares at the object is smaller than a reference time, may output content at an initial value. According to an embodiment, the electronic device may differently configure a time used to determine that the user recognizes content, and a time used to determine that the user does not recognize content any longer.

Figure 17:
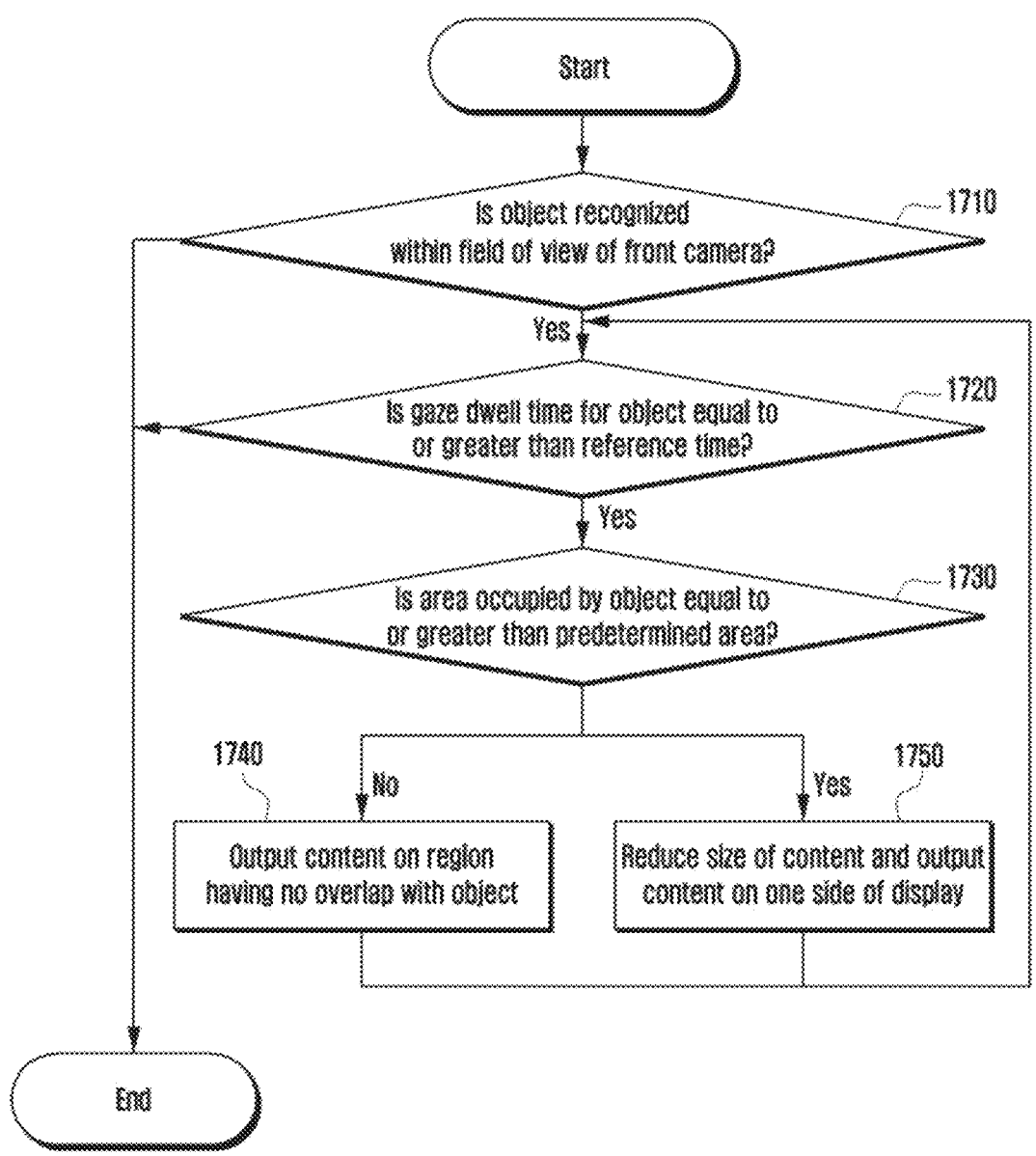
FIG. 17 is a flowchart of a method of determining an output type of content by an electronic device according to various embodiments.

FIG. 17 is a flowchart of a method of determining an output type by an electronic device according to various embodiments.

According to various embodiments, in operation 1710, the electronic device may recognize an object within a field of view of a front camera. In operation 1720, the electronic device may identify whether a user's gaze dwell time for the object is equal to or greater than a reference time. The electronic device may determine that the user recognizes the object, the gaze dwell time for which is equal to or greater than the reference time. The electronic device may determine that the user does not recognize the object, the gaze dwell time for which is smaller than the reference time.

According to various embodiments, in operation 1730, the electronic device may determine whether an area occupied by the object recognized by the user is equal to or greater than a predetermined area. The electronic device may determine an output type of content, based on the area occupied by the object.

According to various embodiments, in operation 1740, when the area occupied by the object is smaller than the predetermined area, the electronic device may output the content on a region having no overlap with the object. According to an embodiment, when the object is positioned in an edge region of the field of view, or when the area occupied by the object is small even if the object is positioned in a center region, the electronic device may not output the content on a region on which the object and the content overlap.

According to various embodiments, in operation 1750, when the area occupied by the object is greater than or equal to the predetermined area, the electronic device may reduce the size of the content and output same on one side of a display. According to an embodiment, when the object have the predetermined area or wider, and is positioned in the center region of the field of view, the electronic device may reduce the size of the content. According to an embodiment, when the electronic device recognizes that the user holds the object with two hands, the electronic device may reduce the size of the content. According to an embodiment, when the electronic device is outputting content having a high importance level even if the above condition is satisfied, the electronic device may not reduce the size of the content, and output same on a region having no overlap with the object.

A content display method of an electronic device according to various embodiments may include outputting at least one content on a display, recognizing at least one object by controlling a front camera, obtaining a user's gaze dwell time for the object from an eye tracking camera, when the gaze dwell time is greater than or equal to a reference time, calculating an area occupied by the object in a field of view (FOV) of the front camera, based on the area, outputting the at least one content on a region having no overlap with the object, or reducing a size of the at least one content and outputting the at least one content on one side of the display, and when the user's gaze dwell time for the object is smaller than the reference time, outputting the at least one content in a type identical to an initial output type.

According to various embodiments, the outputting of the content may further include obtaining position coordinates of the object in the field of view from the front camera, determining, based on the position coordinates, a region on which the object is positioned in an edge region or a center region of the field of view, and outputting the at least one content, based on the area and the region on which the object is positioned in the field of view.

According to various embodiments, the outputting of the content may further include, when the object is positioned in the edge region of the field of view, or the area is smaller than a predetermined area, outputting the at least one content on a region having no overlap with the object, and when the object is positioned in the center region of the field of view, and the area is equal to or greater than the predetermined area, reducing the size of the at least one content and outputting the at least one content on one side of the display.

According to various embodiments, the outputting of the content may further include determining whether the object is a pre-registered object, based on an image of the object obtained using the front camera, and when the object is a pre-registered object, obtaining the user's gaze dwell time for the object.

According to various embodiments, the outputting of the content may further include, when the size of the at least one content is reduced and then the at least one content is outplaced on one side of the display, temporarily stopping reproduction of the content at a time point of reducing the size of the content.

According to various embodiments, the outputting of the content may further include obtaining an image of a hand with which the object is held from the front camera, and when the gaze dwell time is equal to or greater than the reference time, and the object is held with one hand, outputting the at least one content on a region having no overlap with the object, based on the area, and when the gaze dwell time is equal to or greater than the reference time, and the object is held with both hands, reducing the size of the at least one content and outputting the at least one content on one side of the display.

According to various embodiments, the outputting of the content may further include, when the front camera recognizes a first object and a second object, determining, as an object of interest, at least one of the first object and the second object, based on a first gaze dwell time for the first object and a second gaze dwell time for the second object, and outputting the at least one content, based on an area occupied by the at least one object of interest in the field of view.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope as defined by the following claims and their equivalents.

What is claimed is:

1. An electronic device comprising:
   a body part;
   a glass member disposed on the body part;
   a display disposed on the glass member;
   a support part rotatably connected to the body part;
   a sensor comprising an eye tracking camera and a front camera configured to capture an image of a front side of a user; and
   a processor operatively connected to the display and the sensor,
   wherein the processor is configured to:
      output at least one content via the display;
      recognize at least one object by the front camera;
      obtain the user's gaze dwell time for the object by the eye tracking camera;
      based on the gaze dwell time being longer than or equal to a reference time, obtain an area occupied by the object in a field of view (FOV) of the front camera;
      determine an importance level of the at least one content;
      in case of the importance level being less than a predetermined value, based on the area, output the at least one content on a region having no overlap with the object, or reduce a size of the at least one content and output the at least one content on one side of the display;
      in case of the importance level being equal to or greater than the predetermined value, output the at least one content without reducing the size; and
      based on the user's gaze dwell time for the object being less than the reference time, output the at least one content in a type identical to an initial output type.

2. The electronic device of claim 1, wherein the processor is further configured to:
   obtain position coordinates of the object in the FOV by the front camera;
   determine, based on the position coordinates, a region on which the object is positioned in an edge region of the FOV or a center region of the FOV; and
   output the at least one content, based on the area and the region on which the object is positioned in the FOV.

3. The electronic device of claim 2, wherein the processor is further configured to:
   based on the object being positioned in the edge region of the FOV, or the area being smaller than a predetermined area, output the at least one content on a region having no overlap with the object; and
   based on the object being positioned in the center region of the FOV, and the area being equal to or greater than the predetermined area, reduce the size of the at least one content and output the at least one content on one side of the display.

4. The electronic device of claim 3, wherein the processor is further configured to:
   based on the at least one content being output on the region having no overlap with the object,
   based on the area occupied by the object being smaller than the predetermined area, output the at least one content on a region remaining excluding a region displaying the object; and
   based on the area occupied by the object being equal to or greater than the predetermined area, and the region displaying the object being included in the edge region, move a region outputting the at least one content so that the moved region does not overlap with the region displaying the object.

5. The electronic device of claim 1, wherein the processor is further configured to:
   determine whether the object is a pre-registered object based on an image of the object obtained using the front camera; and
   based on the object being a pre-registered object, obtain the user's gaze dwell time for the object.

6. The electronic device of claim 5, wherein the processor is further configured to:
   based on the object being a pre-registered object, output a graphic user interface (UI) comprising additional information corresponding to the object on the display.

7. The electronic device of claim 1, wherein the processor is further configured to:
   based on the size of the at least one content being reduced and the at least one content being output on one side of the display temporarily stop reproduction of the content at a time point of reducing the size of the content.

8. The electronic device of claim 1, wherein the processor is further configured to:
   search for an image corresponding to the object and obtain related information corresponding to the image; and
   output a graphic user interface (UI) comprising the related information at one side of the object in the FOV.

9. The electronic device of claim 1, wherein the processor is further configured to:
- obtain an image of a hand of the user with which the object is held by the front camera;
- based on the gaze dwell time being equal to or longer than the reference time, and the object being held with one hand of the user, output the at least one content on a region having no overlap with the object, based on the area; and
- based on the gaze dwell time being equal to or longer than the reference time, and the object being held with both hands of the user, reduce the size of the at least one content and output the at least one content on one side of the display.

10. The electronic device of claim 1, wherein the processor is further configured to:
- based on the front camera recognizing a first object and a second object,
- determine, as an object of interest, at least one of the first object and the second object, based on a first gaze dwell time for the first object and a second gaze dwell time for the second object; and
- output the at least one content, based on an area occupied by the at least one object of interest in the FOV.

11. The electronic device of claim 1, wherein the processor is further configured to determine the user has recognized the object, based on recognizing a gesture of a hand of the user holding the object by the front camera.

12. The electronic device of claim 11, wherein the processor is further configured to:
- generate a unique gesture of an object, map the unique gesture to the object, and store the mapped unique gesture and object; and
- based on the unique gesture being recognized, determine the user has recognized the object mapped to the unique gesture.

13. A content display method of an electronic device, the method comprising:
- outputting at least one content on a display;
- recognizing at least one object by a front camera;
- obtaining a user's gaze dwell time for the object by an eye tracking camera;
- based on the gaze dwell time being longer than or equal to a reference time, obtaining an area occupied by the object in a field of view (FOV) of the front camera;
- determining an importance level of the at least one content;
- in case of the importance level being less than a predetermined value, based on the area, outputting the at least one content on a region having no overlap with the object, or reducing a size of the at least one content and outputting the at least one content on one side of the display;
- in case of the importance level being equal to or greater than the predetermined value, output the at least one content without reducing the size; and
- based on the user's gaze dwell time for the object being less than the reference time, outputting the at least one content in a type identical to an initial output type.

14. The method of claim 13, wherein the outputting of the content further comprises:
- obtaining position coordinates of the object in the FOV by the front camera;
- determining, based on the position coordinates, a region on which the object is positioned in an edge region or a center region of the FOV; and
- outputting the at least one content, based on the area and the region on which the object is positioned in the FOV.

15. The method of claim 14, wherein the outputting of the content further comprises:
- based on the object being positioned in the edge region of the FOV, or the area being smaller than a predetermined area, outputting the at least one content on a region having no overlap with the object; and
- based on the object being positioned in the center region of the FOV, and the area being equal to or greater than the predetermined area, reducing the size of the at least one content and outputting the at least one content on one side of the display.

16. The method of claim 13, wherein the outputting of the content further comprises:
- determining whether the object is a pre-registered object, based on an image of the object obtained by the front camera; and
- based on the object being a pre-registered object, obtaining the user's gaze dwell time for the object.

17. The method of claim 13, wherein the outputting of the content further comprises:
- based on the size of the at least one content being reduced and the at least one content being output on one side of the display, temporarily stopping reproduction of the content at a time point of reducing the size of the content.

18. The method of claim 13, wherein the outputting of the content further comprises:
- obtaining an image of a hand of the user with which the object is held by the front camera;
- based on the gaze dwell time being equal to or longer than the reference time, and the object being held with one hand of the user, outputting the at least one content on a region having no overlap with the object, based on the area; and
- based on the gaze dwell time being equal to or longer than the reference time, and the object being held with both hands of the user, reducing the size of the at least one content and outputting the at least one content on one side of the display.

19. The method of claim 13, wherein the outputting of the content further comprises:
- based on the front camera recognizing a first object and a second object,
- determining, as an object of interest, at least one of the first object and the second object, based on a first gaze dwell time for the first object and a second gaze dwell time for the second object; and
- outputting the at least one content, based on an area occupied by the at least one object of interest in the FOV.

* * * * *